United States Patent
Rashid et al.

(10) Patent No.: US 7,065,090 B2
(45) Date of Patent: Jun. 20, 2006

(54) CROSS-BAR SWITCH SUPPORTING IMPLICIT MULTICAST ADDRESSING

(75) Inventors: Abbas Rashid, Fremont, CA (US); Nazar Zaidi, San Jose, CA (US); Mark Bryers, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 692 days.

(21) Appl. No.: 10/036,603

(22) Filed: Dec. 21, 2001

(65) Prior Publication Data

US 2003/0043817 A1    Mar. 6, 2003

Related U.S. Application Data

(63) Continuation of application No. 09/900,514, filed on Jul. 6, 2001.

(51) Int. Cl.
*H04L 12/56* (2006.01)
*H04L 12/28* (2006.01)

(52) U.S. Cl. ............... 370/395.31; 379/272; 709/244; 711/221

(58) Field of Classification Search ........ 370/422–424, 370/452, 460, 222, 389, 395.31; 379/272–277; 709/238–244; 711/221
See application file for complete search history.

(56) References Cited

U.S. PATENT DOCUMENTS

| | | |
|---|---|---|
| 4,769,810 A | 9/1988 | Eckberg et al. |
| 5,416,769 A | 5/1995 | Karol |
| 5,613,136 A | 3/1997 | Casavant et al. |
| 5,721,855 A | 2/1998 | Hinton et al. |
| 5,787,073 A | 7/1998 | Ikeda |
| 5,796,719 A * | 8/1998 | Peris et al. ............... 370/231 |
| 5,892,766 A | 4/1999 | Wicki et al. |
| 5,905,873 A | 5/1999 | Hartmann et al. |
| 5,978,359 A | 11/1999 | Caldara et al. |
| 6,047,002 A | 4/2000 | Hartmann et al. |
| 6,104,700 A | 8/2000 | Haddock et al. |
| 6,115,373 A | 9/2000 | Lea |
| 6,144,636 A | 11/2000 | Aimoto et al. |
| 6,154,462 A * | 11/2000 | Coden ..................... 370/403 |
| 6,188,698 B1 | 2/2001 | Garland et al. |
| 6,212,165 B1 | 4/2001 | Mann et al. |
| 6,223,260 B1 | 4/2001 | Gujral et al. |

(Continued)

OTHER PUBLICATIONS

Harmon, William "32-Bit Bus Master Ethernet Interface for the 68030 (Using the Macintosh SE/30)," Apr. 1993.

(Continued)

*Primary Examiner*—Chi Pham
*Assistant Examiner*—Ronald Abelson
(74) *Attorney, Agent, or Firm*—Shumaker & Sieffert, P.A.

(57) ABSTRACT

A cross-bar switch includes a set of input ports and a set of sink ports in communication with the input ports. The input ports receive packets, which are snooped by the sink ports. The cross-bar switch also includes a set of port address tables. Each port address table is adapted to store data identifying a plurality of destinations supported by a sink port. For example, a first port address table is adapted to identify a plurality of destinations supported by a first sink port in the set of sink ports. When determining whether to accept a packet, a sink port considers whether the packet's destination is identified in the sink port's port address table. By supporting multiple destinations, a port address table implicitly facilitates a sink port's multicast operation.

34 Claims, 10 Drawing Sheets

U.S. PATENT DOCUMENTS

| | | |
|---|---|---|
| 6,246,692 B1 * | 6/2001 | Dai et al. .................. 370/438 |
| 6,314,085 B1 | 11/2001 | Saranka |
| 6,327,246 B1 | 12/2001 | Jones |
| 6,363,077 B1 * | 3/2002 | Wong et al. ............... 370/422 |
| 6,374,329 B1 | 4/2002 | McKinney et al. |
| 6,381,214 B1 * | 4/2002 | Prasad .................... 370/230.1 |
| 6,392,991 B1 | 5/2002 | Yamamoto et al. |
| 6,405,258 B1 | 6/2002 | Erimli et al. |
| 6,405,289 B1 | 6/2002 | Arimilli et al. |
| 6,460,088 B1 | 10/2002 | Merchant |
| 6,466,580 B1 | 10/2002 | Leung |
| 6,470,016 B1 | 10/2002 | Kalkunte et al. |
| 6,480,897 B1 | 11/2002 | Desnoyers et al. |
| 6,480,911 B1 | 11/2002 | Lu |
| 6,563,818 B1 | 5/2003 | Sang et al. |
| 6,614,758 B1 | 9/2003 | Wong et al. |
| 6,621,818 B1 * | 9/2003 | Szczepanek et al. ........ 370/389 |
| 6,625,157 B1 | 9/2003 | Niu et al. |
| 6,628,613 B1 | 9/2003 | Joung et al. |
| 6,654,369 B1 * | 11/2003 | Pelisster et al. ............ 370/389 |
| 6,658,016 B1 * | 12/2003 | Dai et al. .................. 370/424 |
| 6,667,985 B1 | 12/2003 | Drummond-Murray |
| 6,697,362 B1 | 2/2004 | Akella et al. |
| 6,700,899 B1 | 3/2004 | Cao |
| 6,725,270 B1 | 4/2004 | Yu et al. |
| 6,728,206 B1 * | 4/2004 | Carlson .................... 370/222 |
| 6,748,435 B1 | 6/2004 | Wang et al. |
| 6,862,289 B1 | 3/2005 | Stiegler et al. |
| 6,873,618 B1 | 3/2005 | Weaver |
| 6,934,297 B1 * | 8/2005 | Bensaou et al. ........... 370/445 |
| 6,947,446 B1 | 9/2005 | LoGalbo et al. |
| 2001/0026535 A1 | 10/2001 | Amou et al. |
| 2001/0038633 A1 | 11/2001 | Robertson et al. |
| 2001/0042190 A1 | 11/2001 | Tremblay et al. |
| 2002/0007443 A1 | 1/2002 | Gharachorloo et al. |
| 2002/0027902 A1 | 3/2002 | Reeve et al. |
| 2002/0163914 A1 | 11/2002 | Dooley |
| 2003/0126233 A1 | 7/2003 | Bryers et al. |
| 2004/0100954 A1 | 5/2004 | Dai et al. |

OTHER PUBLICATIONS

Troutman, Denise "DP83916EB-AT: High Performance AT Compatible Bus Master Ethernet Adapter Card," Nov. 1992.

* cited by examiner

CROSS-BAR SWITCH SUPPORTING IMPLICIT MULTICAST ADDRESSING

This application claims the benefit of and is a continuation of U.S. patent application Ser. No. 09/900,514, "Cross-Bar Switch," filed on Jul. 6, 2001, which is incorporated herein by reference.

CROSS-REFERENCE TO RELATED APPLICATIONS

This Application is related to the following amended section:

"Cross-Bar Switch With Explicit Multicast Support," by Abbas Rashid, Mark Bryers, and Nazar Zaidi, U.S. patent application Ser. No. 10/036,602, filed the same day as the present application;

"Cross-Bar Switch Incorporating A Sink Port With Retry Capability," by Mark Bryers, Abbas Rashid, and Nazar Zaidi, U.S. patent application Ser. No. 10/036,762, filed the same day as the present application; and "Cross-Bar Switching Employing A Multiple Entry Point FIFO," by Abbas Rashid and Nazar Zaidi, U.S. patent application Ser. No. 10/036,622, filed the same day as the present application; and "Cross-Bar Switch With Bandwidth Allocation," by Mark Bryers, Fred Gruner, Abbas Rashid, and Nazar Zaidi, U.S. patent application Ser. No. 10/036,575, filed the same day as the present application; and "Cross-Bar Switch With Sink Port Accepting Multiple Packets," by Abbas Rashid, Mark Bryers, and Nazar Zaidi, U.S. patent application Ser. No. 10/037,144, filed the same day as the present application.

Each of these related Applications is incorporated herein by reference.

BACKGROUND OF THE INVENTION

1. Field of the Invention

The present invention is directed to the field of routing data, including the routing of data in a data processing system or communications network.

2. Description of the Related Art

In data processing environments, multiple data processing engines often require access to the same data. The processing engines pass the data among themselves, until all processing involving the data is complete. In some instances, the processing engines reside in separate systems and transfer data over a communications network. Alternatively, the processing engines all reside in a single system and transfer data over an intra-system network or bus.

A cross-bar facilitates the transfer of data between processing engines by routing incoming data to a target destination. Processing engines send data to the cross-bar with a target destination identifier. The cross-bar determines whether the target is coupled to the cross-bar. If the target is coupled, the cross-bar forwards the data. Otherwise, the cross-bar takes no action on the data.

A traditional cross-bar employs a series of switches to link incoming data from an input port to a target output port. At each switch, the cross-bar makes a routing determination, based on the target destination identifier. If the identified target is coupled to the cross-bar, the incoming data is eventually routed through the network of switches to an output port coupled to the identified target.

Traditional cross-bars often require incoming data to travel through several levels of switches before reaching an output port. Traditional cross-bars employ a large number of switches, making design complex. The large number of switches makes it difficult to meet timing goals and physical design criteria. These traditional cross-bars also consume significant power and circuit space. The disadvantages associated with a traditional cross-bar are particularly troubling when implementing the cross-bar on an integrated circuit.

The switching circuitry in existing cross-bars prevents a single output port from simultaneously servicing multiple packets for a single target. If two input ports receive data for the same target, only one set of incoming data will be transferred to the target. The other set of incoming data is blocked. The blocked data must be resent at a later time—unnecessarily utilizing processing resources and delaying data transfer.

Cross-bars also traditionally support only a single target destination on each output port. This inflexibility makes multicasting addressing impossible, unless special multicast circuitry is added. Multicast addressing allows a single destination identifier to address multiple targets. In many circumstances, one processing engines needs to send the same data to multiple processing engines. Multicast addressing allows a processing engine to accomplish this with a single packet transfer. Without multicast addressing, the processing engine performs multiple packet transfers—wasting both processing resources and system bandwidth.

Support for ensuring quality of service is also inefficient in traditional cross-bars. Existing cross-bars require multiple buffer memories for storing different classes of data. This is wasteful when one or more data classes are idle—the buffer memories for the idle data classes go unused.

Traditional cross-bars are constrained by only supporting packets with limited fixed sizes on the input and output. It is the responsibility of the system that uses the cross-bar switch to break-up large packets of data to conform to the supported fixed packet size at the input. On the output side, the system then has to re-assemble the pieces into the original packets. This puts a significant overhead on the system.

SUMMARY OF THE INVENTION

The present invention, roughly described, pertains to a non-blocking cross-bar switch with the capability of supporting multicast addressing and bandwidth allocation management.

The cross-bar switch includes a set of input ports for receiving data packets and a set of sink ports for transmitting the received packets to identified targets. A set of data rings couples the input ports to the sink ports. The data ring architecture enables the cross-bar switch to be non-blocking—using the data rings, each sink port can simultaneously gain access to multiple data packets targeted to the same destination.

Data rings are better suited for implementation in an integrated circuit than the traditional switches used to couple the cross-bar's input and output ports. Using data rings requires less power, circuit space, and custom layout than traditional switch coupling. In one embodiment of the present invention, the cross-bar switch is implemented in an integrated circuit—making these features significant advantages.

Each cross-bar input port places received data packets on one of the cross-bar's data rings. Each sink port snoops the set of data rings for data packets directed to a destination supported by the sink port. Each sink port accepts and forwards packets with supported destinations. Sink ports can be programmed to support multiple destinations, providing the cross-bar switch with implicit multicast capabilities. Other embodiments of the present invention also include a multi-sink port that snoops the data rings for multicast packets and routes them to targeted destinations.

In one embodiment of the present invention, each sink port includes a multiple entry point first-in-first-out storage buffer ("FIFO"). The multiple entry point FIFO simultaneously buffers multiple packets from the set of data rings. The ability to simultaneously buffer multiple packets enables a sink port's non-blocking operation.

Further embodiments of cross-bar switches in accordance with the present invention include efficient bandwidth allocation management. Packets are assigned priority levels, and the cross-bar switch regulates bandwidth allocation for each priority level. For each priority level, each sink port records the level of traffic and determines a weighted average bandwidth. When the amount of data collected by a sink port exceeds a threshold, the sink port temporarily stops accepting data packets with priority levels having excessive weighted average bandwidths. In order to advance the efficiency of memory use in one embodiment, packets of all priority levels are stored in the same buffer memory within a sink port.

Additional embodiments of cross-bar switches in accordance with the present invention support variable packet sizes. In one embodiment, the cross-bar switch supports packet sizes ranging from 64 to 9,216 bytes. This feature reduces the need for the system employing the cross-bar to break up packets and re-assemble them to conform with fixed packet size limitations, such as the limitations in traditional cross-bars.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

A. System Employing a Cross-Bar Switch

Figure 1:
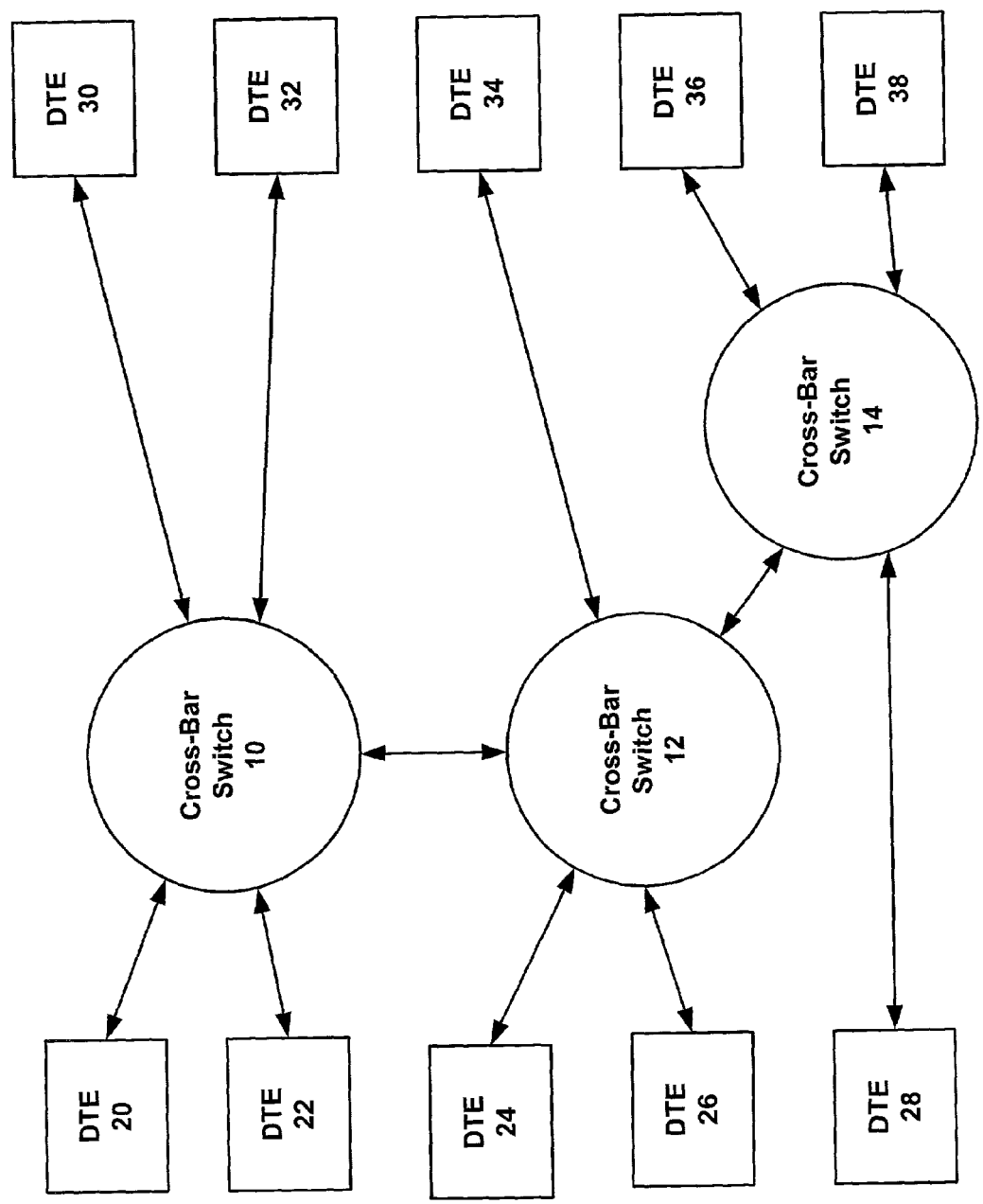
FIG. 1 depicts a system employing cross-bar switches in accordance with the present invention.

FIG. 1 illustrates a system employing cross-bar switches 10, 12, and 14, which operate in accordance with the present invention. Cross-bar switch 10 is coupled to transfer packets between cross-bar switch 12 and data terminal equipment ("DTE") 20, 22, 30 and 32. Cross-bar switch 12 is coupled to transfer packets between cross-bar switches 10 and 14 and DTE 24, 26, and 34. Cross-bar switch 14 is coupled to transfer packets between cross-bar switch 12 and DTE 28, 36, and 38.

DTE is a generic name for a computing system including a processing engine, ranging from a complex multi-processor computer system to a stand-alone processing engine. At least one example of a DTE is multi-processor unit 10 described in U.S. patent application Ser. No. 09/900,481, entitled Multi-Processor System, filed on Jul. 6, 2001, and hereby incorporated by reference.

In one embodiment, all of the elements appearing in FIG. 1 reside in the same system and are coupled together by intra-system communications links. Alternatively, the elements in FIG. 1 are located in separate systems and coupled together over a communications network. An example of one such communications network is a network conforming to the Institute of Electrical and Electronic Engineers ("IEEE") 802.3 Standard employing GMII Gigabit Ethernet signaling. Intra-system communications links employing such signaling standards can also be employed.

B. Cross-Bar Switch

Figure 2:
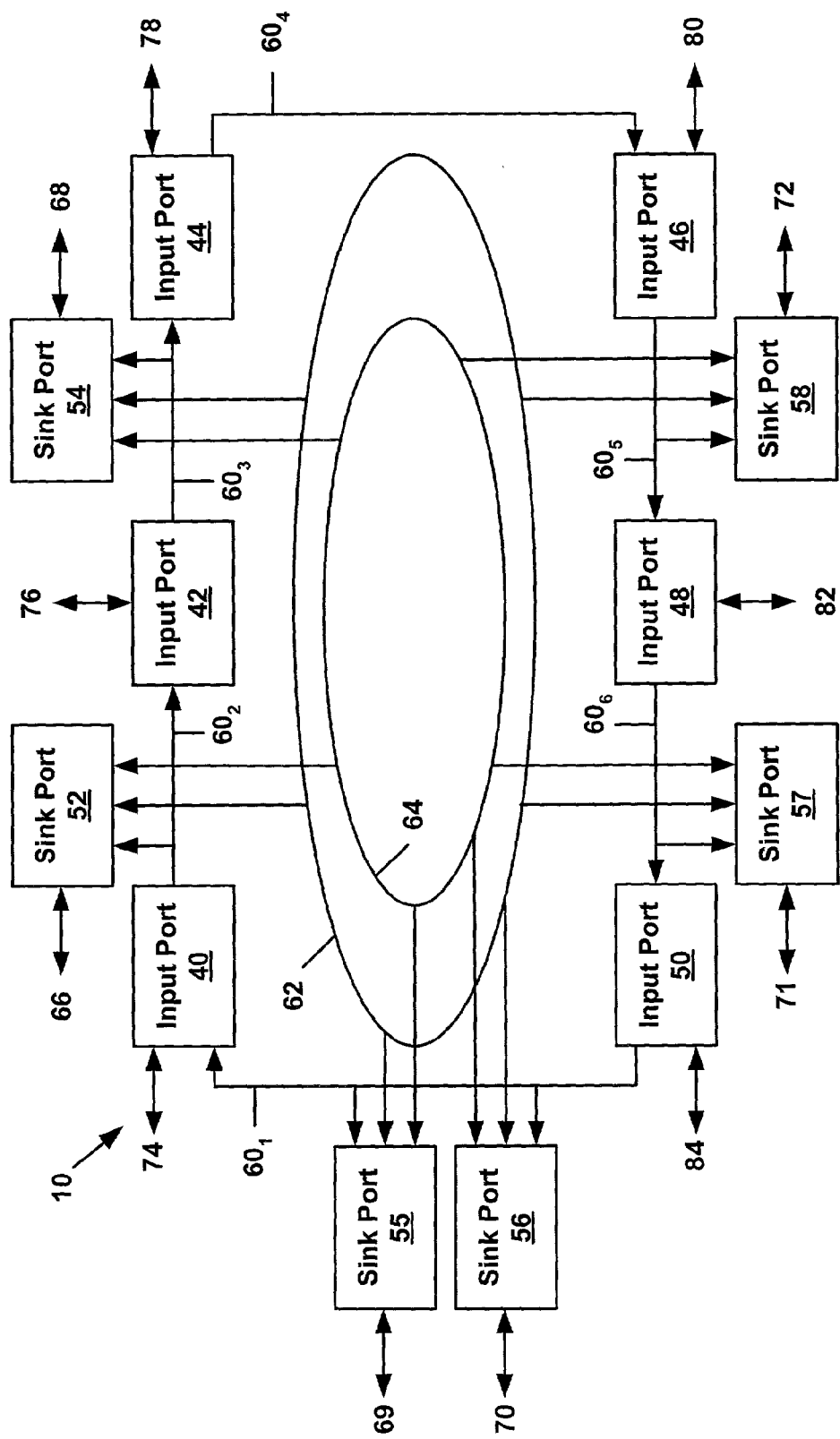
FIG. 2 shows one embodiment of a cross-bar switch in accordance with the present invention.

FIG. 2 depicts circuitry for one embodiment of cross-bar switch 10 in accordance with the present invention. Although explained in detail below with reference to cross-bar switch 10, the circuitry shown in FIG. 2 is also applicable to cross-bar switches 12 and 14 in FIG. 1. In one embodiment, cross-bar switch 10 is implemented in an integrated circuit. Alternatively, cross-bar switch 10 is not implemented in an integrated circuit.

Cross-bar switch 10 includes input ports 40, 42, 44, 46, 48, and 50 for receiving data packets on communications links 74, 76, 78, 80, 82, and 84, respectively. Each communications link 74, 76, 78, 80, 82, and 84 is designed for coupling to a data source, such as a DTE or cross-bar device, and supports protocol and signaling for transferring packets. One such protocol and signaling standard is the IEEE 802.3 Standard for a communications network supporting GMII Gigabit Ethernet.

Each input port is coupled to another input port via data ring 60. Data ring 60 is formed by data ring segments $60_1$–$60_6$, which each couple one input port to another input port. Segment $60_1$ couples input port 50 to input port 40. Segment $60_2$ couples input port 40 to input port 42. Segment $60_3$ couples input port 42 to input port 44. Segment $60_4$ couples input port 44 to input port 46. Segment $60_5$ couples input port 46 to input port 48. Segment $60_6$ couples input port 48 to input port 50, completing data ring 60.

When an input port receives a data packet on a communications link, the input port forwards the data packet to another input port via the data ring segment coupling the input ports. For example, input port 40 forwards data received on communications link 74 to input port 42 via ring segment $60_2$. Input port 42 forwards data received on communications link 76 to input port 44 via ring segment 60$_3$. Input port 44 forwards data received on communications link 78 to input port 46 via ring segment 60$_4$. Input port 46 forwards data received on communications link 80 to input port 48 via ring segment 60$_5$. Input port 48 forwards data received on communications link 82 to input port 50 via ring segment 60$_6$. Input port 50 forwards data received on communications link 84 to input port 40 via ring segment 60$_1$.

Input ports also forward data received on a data ring segment to another input port. For example, input port 40 forwards data received on ring segment 60$_1$ to input port 42 via ring segment 60$_2$. Input port 42 forwards data received on ring segment 60$_2$ to input port 44 via ring segment 60$_3$. Input port 44 forwards data received on ring segment 60$_3$ to input port 46 via ring segment 60$_4$. Input port 46 forwards data received on ring segment 60$_4$ to input port 48 via ring segment 60$_5$. Input port 48 forwards data received on ring segment 60$_5$ to input port 50 via ring segment 60$_6$. Input port 50 forwards data received on ring segment 60$_6$ to input port 40 via ring segment 60$_1$.

Cross-bar switch 10 also includes data rings 62 and 64. Although not shown in detail, data rings 62 and 64 are the same as data ring 60, each coupling input ports (not shown) together via ring segments. In some embodiments, however, data rings 60, 62, and 64 include different numbers of segments supporting different numbers of input ports.

Cross-bar 10 includes sink ports 52, 54, 55, 56, 57, and 58 for transmitting data packets onto communications links 66, 68, 69, 70, 71, and 72, respectively. Sink ports 52, 54, 55, 56, 57, and 58 are each coupled to data rings 60, 62, and 64 to receive data that input ports supply to rings 60, 62, and 64. Sink ports 52, 54, 55, 56, 57, and 58 snoop data on data rings 60, 62, and 64 to determine whether the data is targeted for a device coupled to the sink port's communication link, such as a DTE or cross-bar switch. Each communications link 66, 68, 69, 70, 71, and 72 is designed for coupling to a data target, such as a DTE or cross-bar device, and supports protocol and signaling for transferring packets. One such protocol and signaling standard is the IEEE 802.3 Standard for a communications network supporting GMII Gigabit Ethernet.

Sink ports 52, 54, 55, 56, 57, and 58 are each capable of supporting data transfers to multiple target addresses on their respective communications links—allowing cross-bar switch 10 to implicitly support multicast addressing. Sink ports 52, 54, 55, 56, 57, and 58 are each capable of simultaneously receiving multiple data packets from rings 60, 62, and 64 and transferring the data to the identified targets—allowing cross-bar switch 10 to be non-blocking when multiple input ports receive data packets destined for the same target. This functionality provides advantages over traditional cross-bar switches, which only support one target address per output port and one packet at a time for a target.

Figure 3:
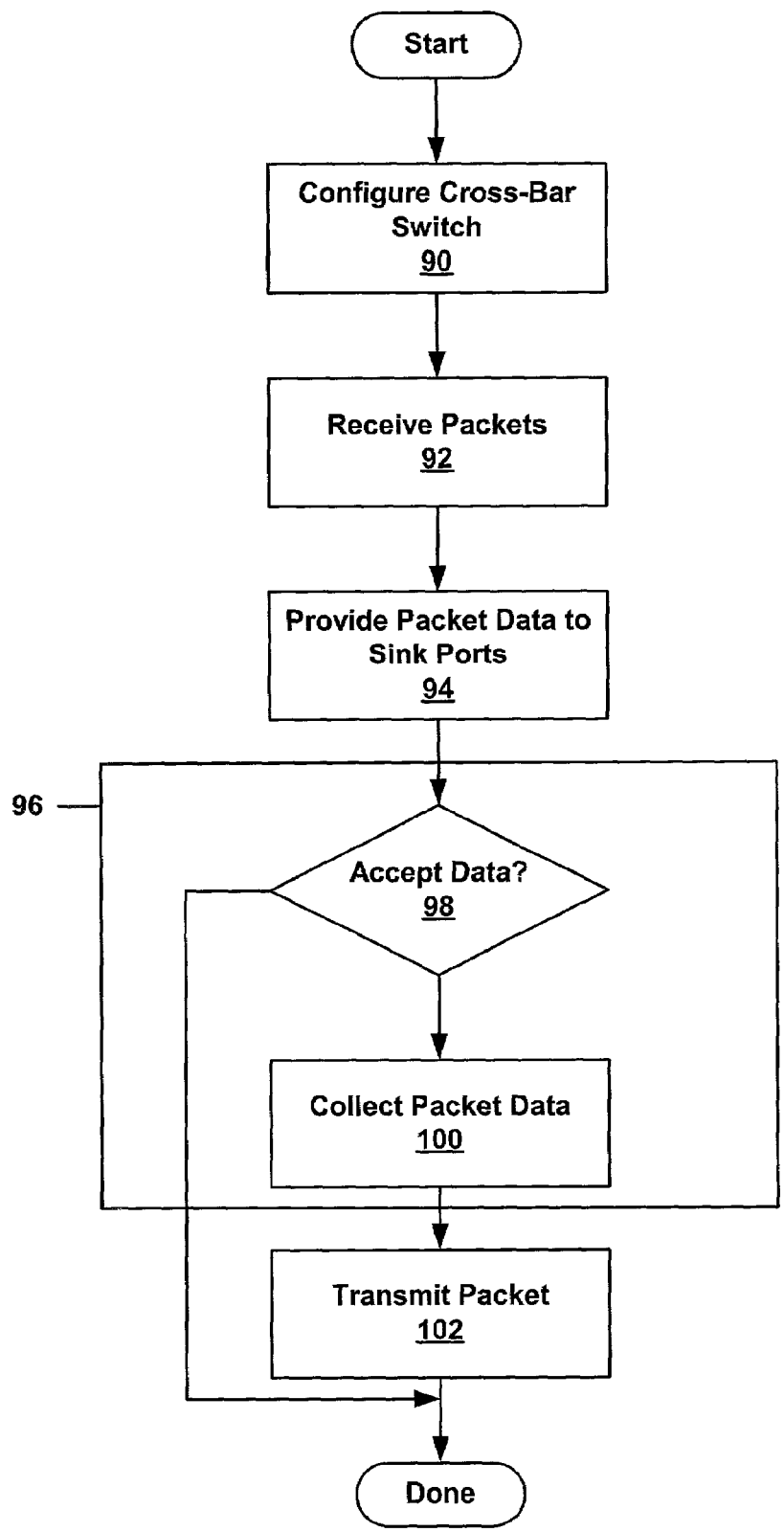
FIG. 3 shows a process employed by a cross-bar switch in accordance with the present invention.

FIG. 3 depicts a flow diagram illustrating a series of steps performed by cross-bar switch 10. A user configures cross-bar switch 10 for operation (step 90). In operation, the input ports in cross-bar switch 10 receive packets on their respective communications links (step 92). The input ports provide the packets to the sink ports in cross-bar switch 10. In cross-bar switch 10 in FIG. 2, the input ports forward the packet data to either data ring 60, 62, or 64 for retrieval by the sink ports (step 94).

Each sink port performs a snooping and collection process—identifying and storing packets addressed to targets supported by the sink port (step 96). Each sink port snoops the packet data on rings 60, 62, and 64 to determine whether to accept the data (step 98). If a sink port detects that a packet fails to meet acceptance criteria, then the sink port does not accept the packet. If a sink port determines that a packet meets acceptance criteria, then the sink port collects the packet data from ring 60, 62, or 64 (step 100). Cross-bar switch 10 transmits packets collected in the sink ports to targeted destinations via the sink ports' respective communication links (step 102). Further details regarding sink port operation appear below, including the acceptance and collection of packets.

In configuration (step 90), a user sends configuration packets to at least one input port in cross-bar switch 10 for delivery to a designated sink port. Configuration packets include configuration settings and instructions for configuring the targeted sink port. For example, input port 40 forwards a configuration packet to data ring 60 targeted for sink port 52. Sink port 52 retrieves the configuration packet from ring 60 and performs a configuration operation in response to the configuration packet. In some instances, a designated sink port responds to a configuration packet by sending a response packet, including status information. Alternatively, the designated sink port responds to the configuration packet by writing configuration data into internal control registers.

Table I below shows a sink port configuration and status register structure in one embodiment of the present invention.

TABLE I

Sink Port Configuration and Status Register Structure

|  |
| --- |
| P |
| Port Address Table [31:0] |
| Port Address Table [63:32] |
| Port Address Table [95:64] |
| Port Address Table [127:96] |
| R |
| Retry Time [15:0] |
| FIFO Thresholds/Priority Weighting Values [23:0] |
| Total Packet Count |
| Configuration Packet Count |
| Port Enable Rejection Count |
| Packet Size Rejection Count |
| Bandwidth Allocation Rejection Count |
| Sink Overload Rejection Count |

The sink port registers provide the following configuration settings: 1) Port Enable ("P")—set to enable the sink port and deasserted to disable the sink port; 2) Port Address Table [127:0]—set bits identify the destination addresses associated with the sink port. For example, when bits 64, 87, and 123 are set, the sink port accepts data packets with those destination addresses; 3) Retry Mode ("R")—set to enable retry operation for the sink port and deasserted to disable retry operation (further details regarding retry operation appear below); 4) Retry Time [15:0]—set to indicate the period of time allowed for retrying a packet transmission; and 5) FIFO Thresholds and Priority Weighting Values [23:0]—set to identify FIFO thresholds and priority weighting values employed in bandwidth allocation management, which is described in detail below.

The sink port register block also maintains the following status registers: 1) Total Packet Count—indicating the number of non-configuration packets accepted by the sink port from data rings 60, 62, and 64; 2) Configuration Packet Count—indicating the number of configuration packets received by cross-bar switch 10; 3) Port Enable Rejection Count—indicating the number of packets having a destination address supported by the sink port, but rejected due to the sink port being disabled; 4) Packet Size Reject Count—indicating the number of packets rejected by the sink port because not enough storage room existed for them in the sink port; 5) Bandwidth Allocation Rejection Count—indicating the number of packets rejected by the sink port for bandwidth allocation reasons; 6) Sink Overload Rejection Count—indicating the number of packets rejected by the sink port because the sink port was already receiving a maximum allowable number of packets.

Figure 4:
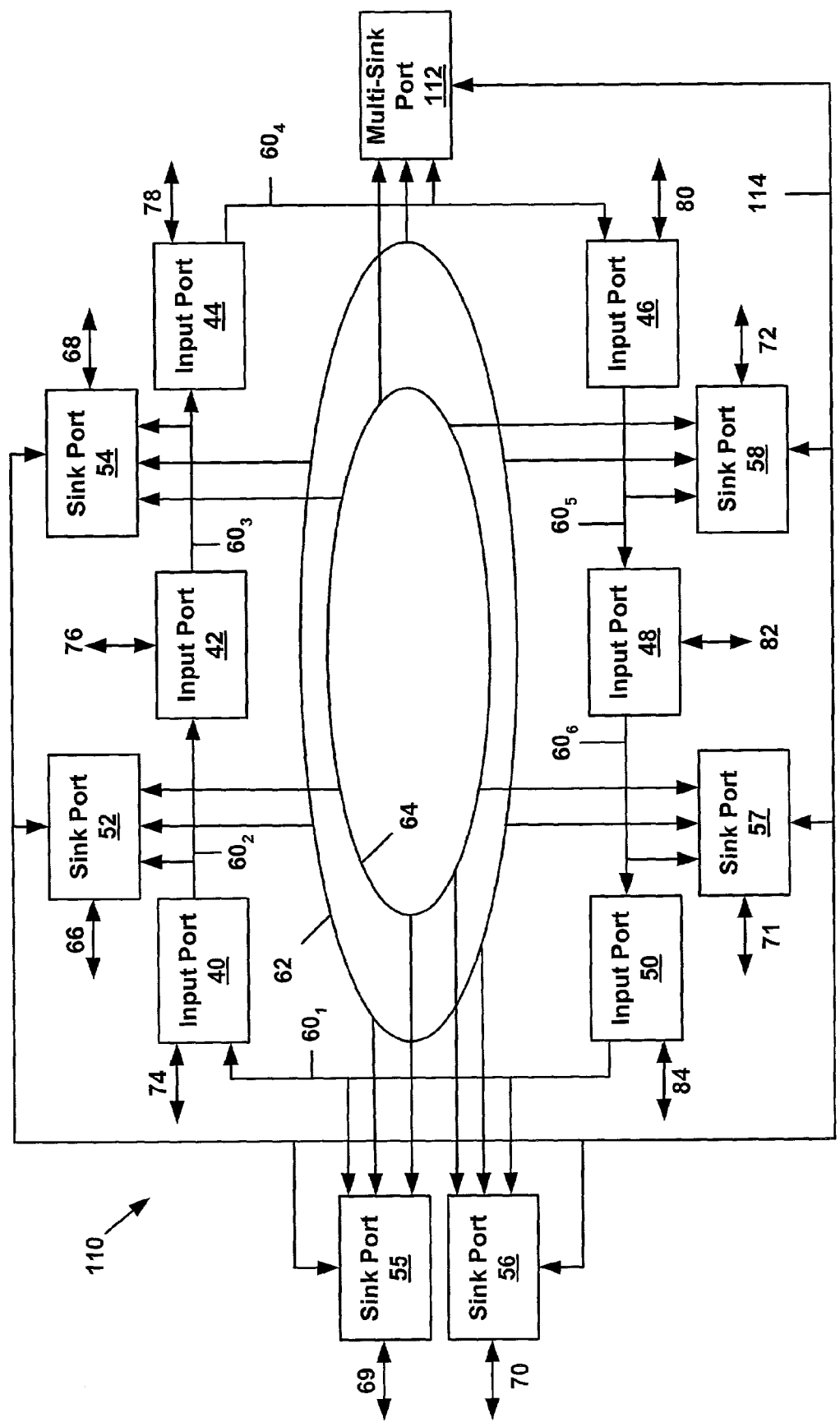
FIG. 4 illustrates an alternate embodiment of a cross-bar in accordance with the present invention.

FIG. 4 shows cross-bar switch 110—an alternate version of cross-bar switch 10, providing explicit support for multicast packets. In cross-bar switch 110, the elements with the same reference numbers appearing in cross-bar switch 10 operate as described for cross-bar switch 10 with any additional functionality being specified below. Cross-bar switch 110 includes multi-sink port 112, which is coupled to sink ports 52, 54, 55, 56, 57, and 58 by interface 114. Multi-sink port 112 is also coupled to data rings 60, 62, and 64.

In operation, multi-sink port 112 snoops data on rings 60, 62, and 64. Multi-sink port 112 accepts multicast packets that have destination addresses included within a set of addresses supported by multi-sink port 112. Multi-sink port 112 forwards accepted packets over interface 114 to sink ports in cross-bar switch 110 that have communication links leading to at least one of the addressed destinations. The sink ports then transfer the packets to their intended destinations. Greater details regarding the operation of multi-sink port 112 appear below.

Like sink ports 52, 54, 55, 56, 57, and 58, multi-sink port 112 also maintains a set of configuration and status registers. Table II below shows a register structure for multi-sink port 112 in one embodiment of the present invention.

TABLE II

Multi-Sink Port Configuration and Status Register Structure

| T |
|---|
| Port Address Table [31:0] |
| Port Address Table [63:32] |
| Port Address Table [95:64] |
| Port Address Table [127:96] |
| FIFO Thresholds/Priority Weighting Values [23:0] |
| Total Packet Count |
| Configuration Packet count |
| Port Enable Rejection Count |
| Packet Size Rejection Count |
| Bandwidth Allocation Rejection Count |
| Sink Overload Rejection Count |
| Multicast Register 0 [19:0] |
| . . . |
| Multicast Register 63 [19:0] |

The multi-sink port registers with the same name as sink port registers perform the same function. The multi-sink port register block includes the following additional registers: 1) Multicast Timeout Select ("T")—set to indicate the maximum timeout for multicast packets. In one embodiment the maximum timeout is either 1,600 or 9,000 internal clock cycles of cross-bar switch 110; and 2) Multicast Registers 0–63—each identifying a set of sink ports to be targeted in response to a multicast destination address.

In one embodiment, cross-bar 110 includes 20 sink ports and each Multicast Register contains 20 corresponding bits. Each set bit indicates that the corresponding sink port is targeted to receive packets with destination addresses corresponding to the Multicast Resister's address. Multi-sink port 112 accepts all packets with destination addresses selected in the Port Address Table and maps the last 6 bits of the destination address to a Multicast Register (See Table II). Further details about the operation of multi-sink port 112 appear below.

The above-described implementations of cross-bar switches 10 and 110 are only two examples of cross-bar switches in accordance with the present invention. Many possible variations fall within the scope of the present invention. For example, in one embodiment of the present invention, rings 60, 62, and 64 are each capable of linking 8 input ports together and have connections to 24 sink ports. In one such embodiment, cross-bar switch 10 in FIG. 2 and cross-bar switch 110 in FIG. 4 each include 20 input ports and 20 sink ports—leaving 4 input port slots unused and 4 sink port slots unused. In this embodiment, each sink port supports up to 128 target addresses and can simultaneously accept up to 7 data packets—6 from input ports and 1 from multi-sink port 112. In alternate embodiments, there is no limit on the number of data packets simultaneously accepted by a sink port.

C. Data Rings

Rings 60, 62, and 64 (FIGS. 2 and 4) include a data field and a control field. In one embodiment of the present invention, the data field is 8 bytes wide and the control field includes the following signals: 1) Data Valid—indicating whether the data field contains valid data; 2) Valid Bytes—indicating the number of valid bytes in the data field; 3) First Line—indicating whether the data field contains the first line of data from the packet supplied by the input port; 4) Last Line—indicating whether the data field contains the last line of data from the packet supplied by the input port; and 5) Source—identifying the input port supplying the packet data carried in the data field.

One with ordinary skill will recognize that different control signals and different data field widths can be employed in alternate embodiments of the present invention.

D. Packet Formats

Cross-bar switches 10 and 110 support the following 3 types of packets: 1) Data Packets; 2) Configuration Packets; and 3) Read Configuration Response Packets.

1. Data Packets

Cross-bar switches 10 and 110 employ data packets to transfer non-configuration information. Table III below illustrates the format of a data packet in one embodiment of the present invention.

TABLE III

| Data Packet Format | | |
|---|---|---|
| 0 | Destination Address | |
| 1 | Size [7:0] | |
| 2 | Priority Level | Size [13:8] |
| 3 | | |
| 4 | | |
| 5 | | |
| 6 | | |
| 7 | | |
| 8-end | Payload | |

A data packet includes a payload and header. The header appears in the data packet's first 8 bytes (Bytes 0–7). The payload immediately follows the header. In one embodiment, the payload is a packet that complies with the IEEE 802.3 Standard for a data packet, except the preamble field is excluded. In one such embodiment, legal packet sizes range from 64 bytes to 9,216 bytes.

The header includes the following fields: 1) Destination Address—identifying the data packet's targeted destination;

2) Size [13:0]—providing the data packet's size in bytes; 3) Priority Level—providing a priority level for the data packet that is used in bandwidth allocation management. The remaining portion of the header is reserved.

In one embodiment, cross-bar switches 10 and 110 perform error checking to ensure that an incoming packet contains the number of bytes indicated in the packet's Size field. If there is an error, the packet will be flagged with an error upon subsequent transmission. In one such embodiment, input ports perform the size check and pass error information on to the sink ports.

2. Configuration Packets

Configuration packets carry configuration instructions and settings for cross-bar switches 10 and 110. Table IV below shows the format of a configuration packet in one embodiment of the present invention.

TABLE IV

| | Configuration Packet Format |
|---|---|
| 0 | Configuration Identifier |
| 1 | |
| 2 | Cross-Bar Switch Identifier |
| ... | |
| 8 | Command |
| 9 | Configuration Register Address ("CRA") [7:0] |
| 10 | Port Identifier          CRA [10:8] |
| ... | |
| 16–63 | Data |

The configuration packet is 64 bytes long, allowing the entire packet to fit on either data ring 60, 62, or 64. The configuration packet includes the following fields: 1) Configuration Identifier—identifying the packet as a configuration packet. In one embodiment, this field is set to a value of 127; 2) Cross-Bar Switch Identifier—identifying the cross-bar switch for which the configuration packet is targeted; 3) Command—identifying the configuration operation to be performed in response to the packet; 4) Port Identifier—identifying a sink port or multi-sink port in the identified cross-bar switch; 5) Configuration Register Address ("CRA") [10:0]—identifying a configuration register in the identified sink port or multi-sink port; 6) Data—containing data used in the configuration operation. Remaining fields in the configuration packet are reserved.

A configuration packet containing a write command causes the identified cross-bar switch to write configuration data into the identified configuration register in the identified sink port. In a write command configuration packet, the Data field contains a value for the sink port to write into the identified configuration register. In one embodiment, this value can be up to 4 bytes long.

A configuration packet containing a read command causes the identified cross-bar switch to send a response packet containing the values of registers in the identified sink port. In a read command configuration packet, the Data field contains a header to be used by a read configuration response packet.

In one embodiment the header is 16 bytes, as shown below in the description of the read configuration response packets. This header is user programmable and set to any value desired by the entity issuing the read command configuration packet.

3. Read Configuration Response Packets

Read configuration response packets carry responses to read commands issued in configuration packets. Multi-sink port 112 and sink ports 52, 54, 55, 56, 57, and 58 supply read configuration response packets on their communications links.

Table V below shows the format of a sink port's read configuration response packet.

TABLE V

| | Sink Port Read Configuration Response Packet Format | | | |
|---|---|---|---|---|
| 0 | | Header [31:0] | | |
| 1 | | Header [63:32] | | |
| 2 | | Header [95:64] | | |
| 3 | | Header [127:96] | | |
| 4 | Priority Weighting Values [11:0] | FIFO Thresholds [11:0] | R | P |
| 5 | | Retry Time | | |
| 6 | | Port Address Table [31:0] | | |
| 7 | | Port Address Table [63:32] | | |
| 8 | | Port Address Table [95:64] | | |
| 9 | | Port Address Table [127:96] | | |
| 10 | | Total Packet Count | | |
| 11 | | Configuration Packet Count | | |
| 12 | | Port Enable Rejection Count | | |
| 13 | | Packet Size Rejection Count | | |
| 14 | | Bandwidth Allocation Rejection Count | | |
| 15 | | Sink Overload Rejection Count | | |

Header [127:0] is the header provided in the read command configuration packet. The remaining fields of the read configuration response packet provide the data held in the above-described sink port registers with corresponding names (See Table I).

Table VI below shows the format of a multi-sink port's read configuration response packet.

TABLE VI

| | Multi-Sink Port Read Configuration Response Packet Format | | |
|---|---|---|---|
| 0 | | Header [31:0] | |
| 1 | | Header [63:32] | |
| 2 | | Header [95:64] | |
| 3 | | Header [127:96] | |
| 4 | Priority Weighting Values [11:0] | FIFO Thresholds [11:0] | T |
| 5 | | Multicast Register [19:0] | |
| 6 | | Port Address Table [31:0] | |
| 7 | | Port Address Table [63:32] | |
| 8 | | Port Address Table [95:64] | |
| 9 | | Port Address Table [127:96] | |
| 10 | | Total Packet Count | |
| 11 | | Configuration Packet Count | |
| 12 | | Port Enable Rejection Count | |
| 13 | | Packet Size Rejection Count | |
| 14 | | Bandwidth Allocation Rejection Count | |
| 15 | | Sink Overload Rejection Count | |

Header [127:0] is the header provided in the read command configuration packet. The Multicast Register field contains the contents of the multi-sink port's Multicast Register that corresponds to the configuration packet's Configuration Register Address field. The remaining fields of the read configuration response packet provide the data held in the above-described multi-sink port registers with corresponding names (See Table II).

E. Input Ports

Figure 5:
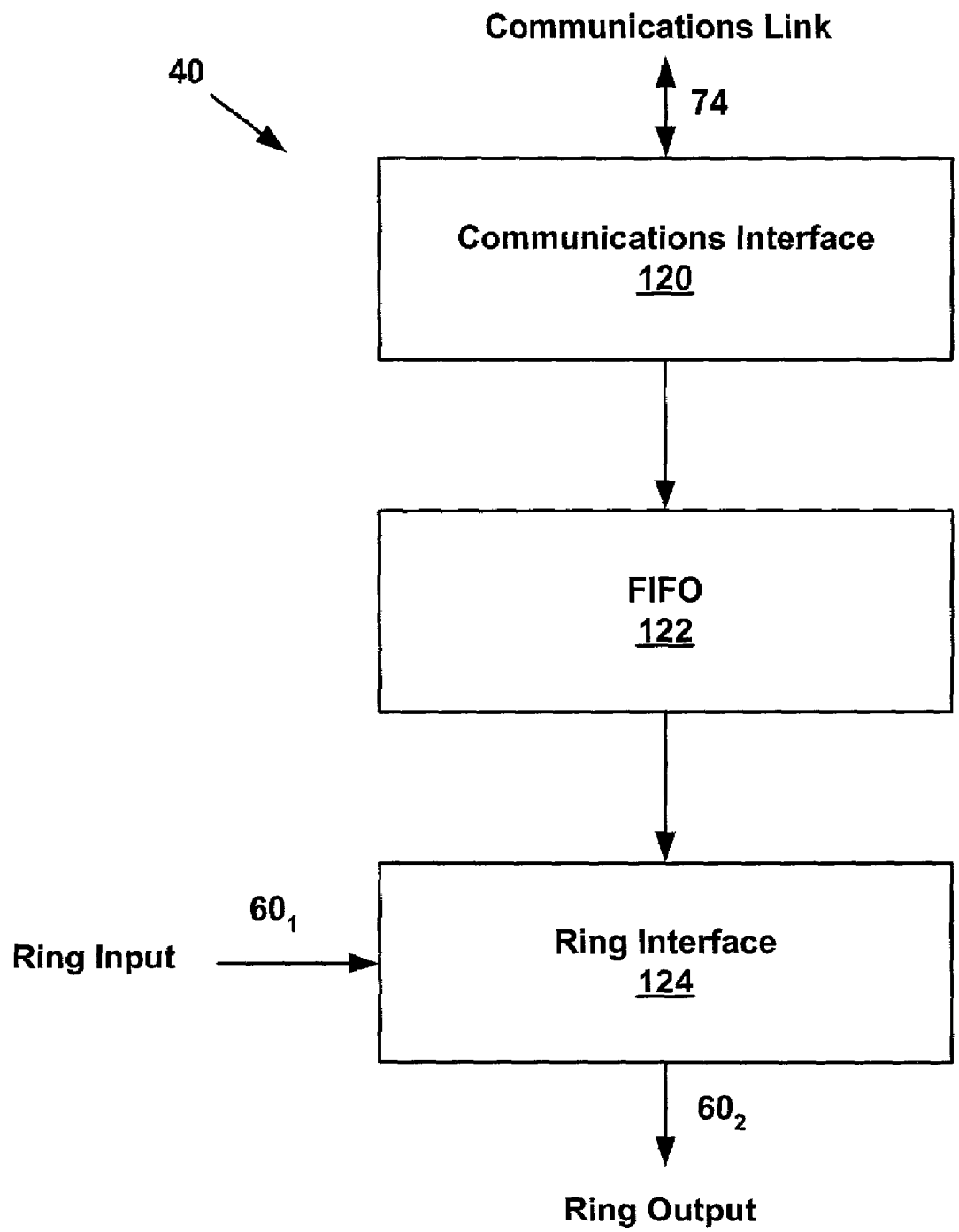
FIG. 5 depicts a block diagram for an input port in the cross-bar switches shown in FIGS. 2 and 4.

FIG. 5 shows a block diagram of input port 40. FIG. 5 is also applicable to input ports 42, 44, 46, 48, and 50.

Input port 40 includes communications interface 120 coupled to receive data from communications link 74. Communication interface 120 is coupled to provide the received data to FIFO 122, so the data becomes synchronized with the cross-bar switch's internal clock. In one version of input port 40, FIFO 122 holds 32 bytes.

FIFO 122 is coupled to provide the received data to ring interface 124, which is coupled to data ring 60. Ring interface 124 is also coupled to receive data from data ring segment 60₁. Ring interface 124 forwards data onto ring 60 via data ring segment 60₂. In addition to providing data, ring interface 124 also generates and provides the above-described data ring control information on ring segment 60₂.

Data is forwarded on ring 60 in time slots. Input port 40 is allotted a time slot on ring 60 for forwarding data from communications link 74 onto ring segment 60₂. In each remaining time slot, input port 40 forwards data from ring segment 60₁ onto segment 60₂. In one embodiment, all input ports coupled to ring 60 place communications link data onto ring 60 in the same time slot. When ring interface 124 receives data on segment 60₁ that originated from sink port 40, ring interface 124 terminates any further propagation of this data on ring 60. In one embodiment, sink port 40 recognizes the arrival of data originating from sink port 40 by counting the number of time slots that elapse after placing data from link 74 onto any segment 60₂—sink port 40 knows the number of time slots required for data placed on ring 60 by port 40 to propagate around ring 60 back to port 40.

In one embodiment, the interface between communications interface 120 and communications link 74 includes the following signals: 1) RXD—an input to input port 40 providing 8 bits of received data; 2) RX_EN—an input to input port 40 indicating RXD is valid; 3) RX_ER—an input to input port 40 indicating an error in RXD; 4) COL—an output from input port 40 indicating that the cross-bar switch cannot accept the incoming data on RXD; and 5) RX_CLK—an input to input port 40 providing a 125 MHz clock for timing reference for RXD.

In one embodiment of the present invention, the above-described signals conform to the reception signals in the IEEE 802.3 Standard for GMII Gigabit Ethernet. In one such embodiment, RX_CLK is the same frequency as the internal clock of cross-bar switch 10 within 100 parts per million.

One of ordinary skill will recognize that in alternate embodiments of the present invention communications interface 120 interfaces to devices conforming to different network standards than described above.

F. Sink Ports

Figure 6:
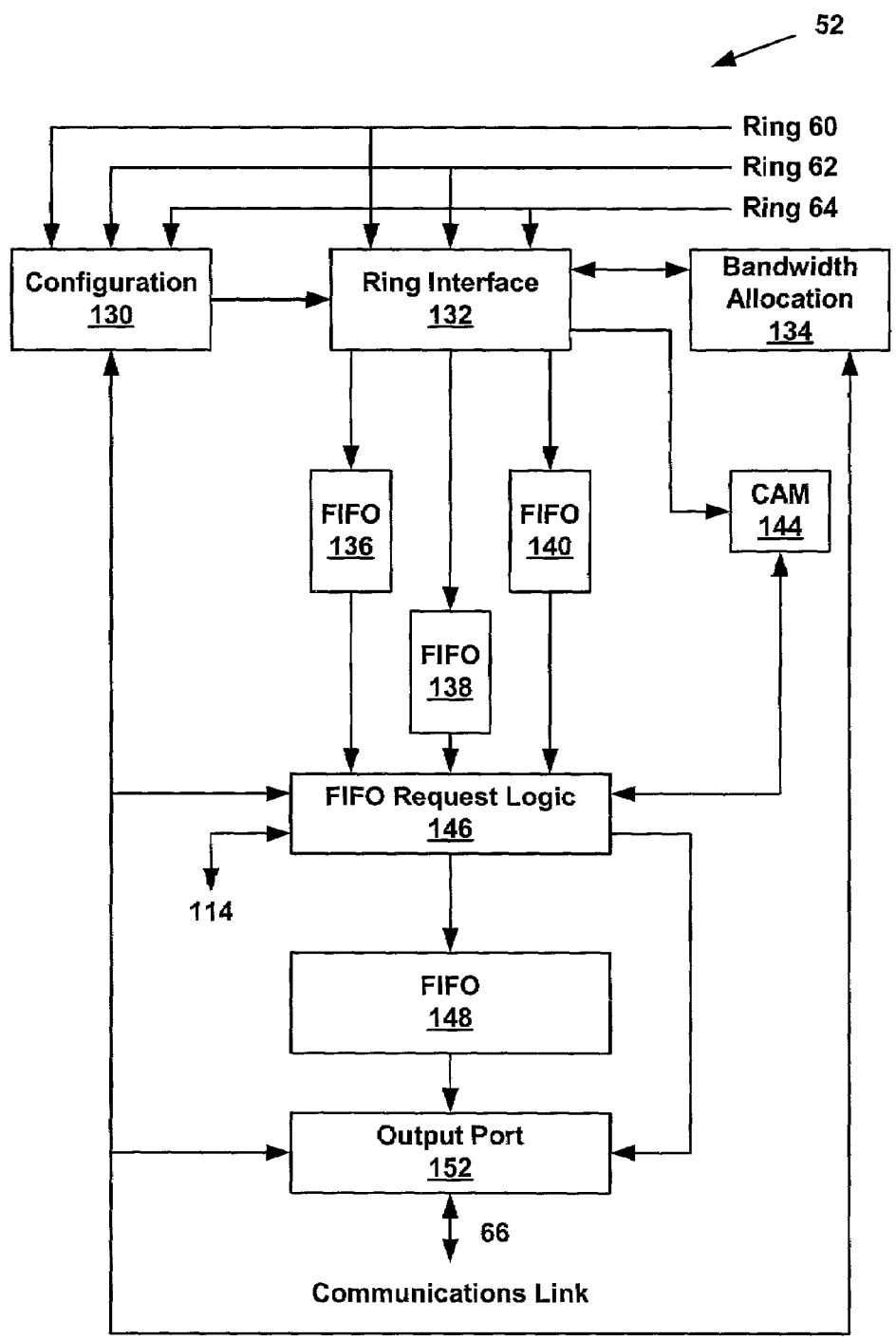
FIG. 6 depicts a block diagram for a sink port in the cross-bar switches shown in FIGS. 2 and 4.

FIG. 6 depicts one version of sink port 52 that is also applicable to sink ports 54, 55, 56, 57, and 58. Sink port 52 includes ring interface 132 coupled to receive data from data rings 60, 62, and 64. Ring interface 132 accepts data packets targeted for sink port 52. Ring interface 132 also accepts configuration packets addressed to cross-bar switches other than the one containing ring interface 132—these configuration packets are treated as data packets. Further details regarding data acceptance is presented below.

Ring interface 132 is coupled to FIFOs 136, 138, and 140 to provide immediate storage for data retrieved from rings 60, 62, and 64. FIFOs 136, 138, and 140 each store data from a respective ring. FIFO 136 stores data from ring 60. FIFO 138 stores data from ring 62. FIFO 140 stores data from ring 64.

FIFO request logic 146 couples FIFOs 136, 138, and 140 to FIFO 148. FIFO request logic 146 is also coupled to multi-sink port interface 114 for coupling multi-sink port 112 to FIFO 148. FIFO 148 is coupled to output port 152 to provide packet data for transmission onto communications link 66.

FIFO 148 serves as a staging area for accumulating packet data for transmission onto communications link 66. In one embodiment, FIFO request logic 146 arbitrates access to FIFO 148 over an 8 cycle period. One cycle is dedicated to transferring data from interface 114 to FIFO 148, if data exists on interface 114. Another cycle is reserved for transferring data from FIFO 148 to output port 152. The remaining cycles are shared on a round-robin basis for FIFOs 136, 138, and 140 to transfer data to FIFO 148.

In an alternate embodiment, FIFO 148 is a multiple port memory capable of simultaneously performing data exchanges on 4 ports. In such an embodiment, there is no need to arbitrate access to FIFO 148 and FIFOs 136, 138, and 140 can be eliminated—ring interface 132 directly transfers data to FIFO 148. In this embodiment, the number of packets that can be simultaneously received by sink port 52 is not limited to 7, since FIFO 148 is no longer shared over 8 cycles.

Output port 152 ensures that packets are transmitted onto communications link 66 in accordance with the signaling protocol employed on link 66. In one embodiment, communications link 66 employs the following signals: 1) TXD—an output from sink port 52 providing a byte of transmit data; 2) TX_EN—an output from sink port 52 indicating TXD has valid data; 3) TX_ER—an output of sink port 52 indicating an error with the data transmitted by sink port 52; 4) TX_CLK—an output from sink port 52 providing a timing reference for TXD; 5) Hold-off/Retry—an input to sink port 52 indicating the receiving port cannot accept data (TXD).

The sink port's Retry Mode register controls the operation of Hold-off/Retry (See Table I). When retry mode is enabled, sink port 52 aborts data transmission on communications link 66 when Hold-off/Retry is asserted. Sink port 52 attempts to retransmit the aborted packet at a later time after Hold-off/Retry is deasserted. Sink port 52 attempts to retransmit the packet for the time period indicated in the sink port's Retry Time register (See Table I). When retry mode is not enabled, asserting Hold-off/Retry causes sink port 52 to discontinue data transmission on communications link 66 once the current packet transmission is complete. Sink port 52 resumes data transmission on communications link 66 once Hold-off/Retry is deasserted.

In one embodiment of the present invention, the above-described signals, except Hold-off/Retry, conform to the transmission signals in the IEEE 802.3 Standard for GMII Gigabit Ethernet. In one such embodiment, TX_CLK is the same frequency as the internal clock of cross-bar switch 10, and output port 152 provides an inter-packet gap of 12 TX_CLK cycles between transmitted packets.

One of ordinary skill will recognize that in alternate embodiments of the present invention sink port 52 includes interfaces to devices conforming to different signaling standards.

Sink port 52 also includes content addressable memory ("CAM") 144. CAM 144 maintains a list of pointers into FIFO 148 for each of the data packets accepted by ring interface 132. Ring interface 52 and FIFO request logic 146 are coupled to CAM 144 to provide information about received packets. Based on the provided information, CAM 144 either creates or supplies an existing FIFO pointer for the packet data being received. Using the supplied pointers, FIFO request logic 146 transfers data from interface 114 and FIFOs 136, 138, and 140 to FIFO 148. The combination of FIFO request logic 146, CAM 144 and FIFO 148 form a multiple entry point FIFO—a FIFO capable of receiving data from multiple sources, namely interface 114 and FIFOs 136, 138, 140, and 148. Further details regarding the operation of CAM 144 appear below.

Sink port 52 includes bandwidth allocation circuit 134 to ensure quality of service by regulating sink port bandwidth for different packet priority levels. Bandwidth allocation circuit 134 is coupled to exchange data with ring interface 132 to facilitate bandwidth allocation management, which is described in detail below.

Sink port 52 includes configuration block 130 for receiving configuration packets. Configuration block 130 is coupled to data rings 60, 62, and 64 to accept configuration packets addressed to sink port 52 in cross-bar switch 10 (switch 110 in FIG. 4). Configuration block 130 contains the sink port register structure described above with reference to Table I.

In response to a write command configuration packet, configuration block 130 modifies the register block in sink port 52. In response to a read command configuration packet, configuration block 130 creates a read configuration response packet, as described above with reference to Table V. Configuration block 130 is coupled to output port 152 to forward the read configuration response packet onto communications link 66. Configuration block 130 is also coupled to Ring interface 132, FIFO request logic 146, bandwidth allocation circuit 134, and output port 152 to provide configuration settings.

Figure 7:
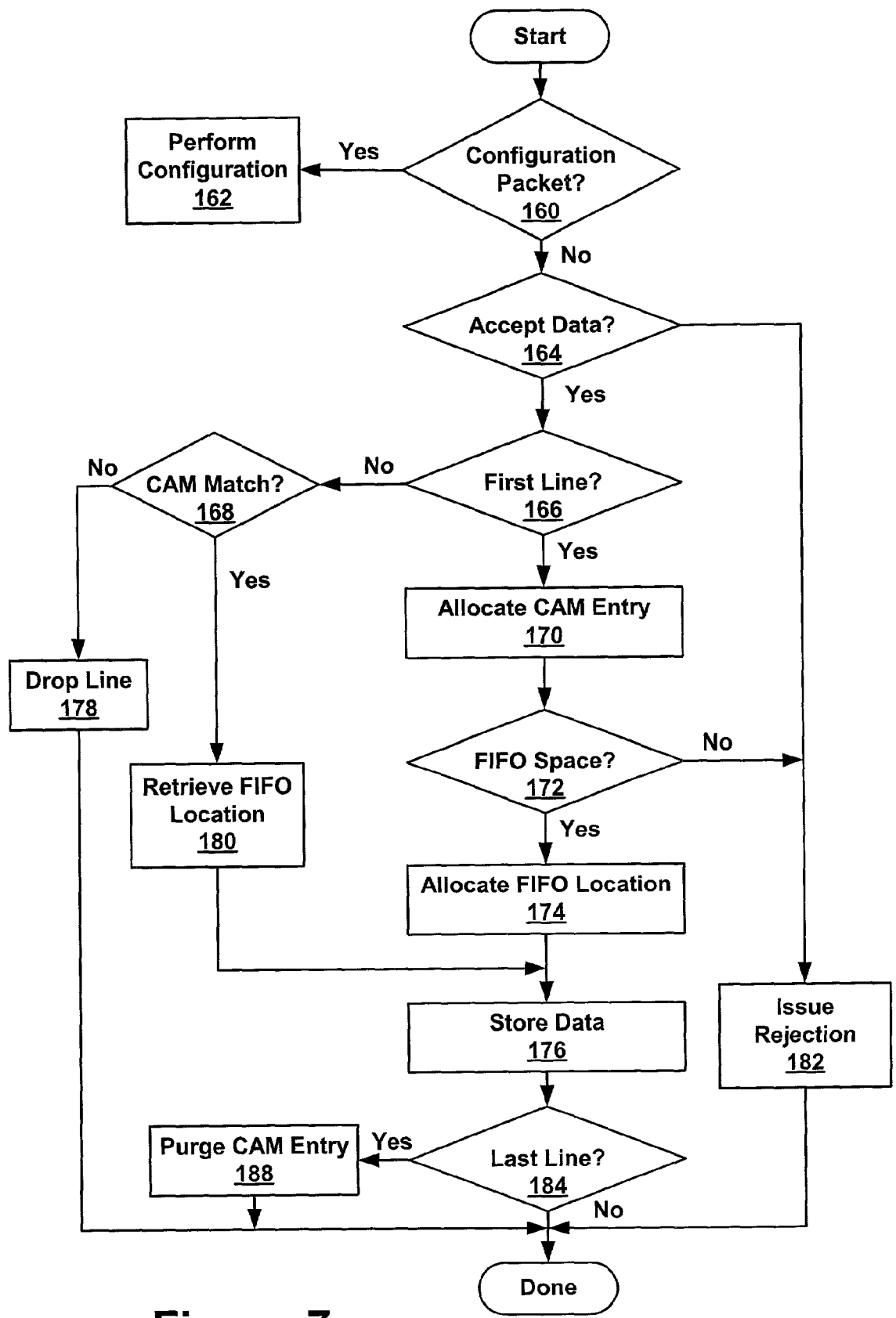
FIG. 7 shows a process employed by the sink port depicted in FIG. 6 for accepting and storing data.

FIG. 7 illustrates steps performed during the operation of sink port 52 to store data in FIFO 148 in one embodiment of the present invention. The same process is applicable to sink ports 54, 55, 56, 57, and 58.

When sink port 52 detects data on data ring 60, 62, or 64, sink port 52 determines whether the data belongs to a configuration packet directed to sink port 52 (step 160). Sink port 52 examines the incoming packet for the following conditions: 1) Configuration Identifier signaling a configuration packet; 2) Cross-Bar Switch Identifier identifying the cross-bar switch housing sink port 52; and 3) Port Identifier identifying sink port 52. If these conditions are met, sink port 52 identifies the packet as a configuration packet for sink port 52 and performs the configuration command specified in the packet (step 162). Otherwise, ring interface 132 determines whether to accept the incoming packet data (step 164).

In performing configuration operations (step 162) sink port 52 forwards the incoming packet to configuration block 130. Configuration block 130 performs the command called for in the packet. In response to a write command, configuration block 130 modifies the configuration registers in sink port 52 in accordance with the packet's write instruction. In response to a read command, configuration block 130 generates a read configuration response packet and forwards the packet to output port 152 for transmission onto communications link 66.

When determining whether to accept the packet (step 164), ring interface 132 makes a series of evaluations. In one embodiment of the present invention, these include verifying the following conditions: 1) sink port 52 is configured to accept the packet's Destination Address, if the First Line data ring control signal is asserted; 2) sink port 52 is currently accepting data from the input port source providing the data, if the First Line data ring control signal is not asserted; 3) bandwidth allocation logic 134 has not indicated that the priority level for the received data is halted, if the First Line data ring control signal is asserted; 4) sink port 52 has not already accepted the maximum allowable number of packets for concurrent reception; 5) sink port 52 is enabled to accept packet data; 6) the packet is a legal packet size—in one embodiment a legal packet size ranges from 64 to 9,000 bytes; and 7) space is available for the packet in FIFO 148.

Sink port 52 rejects the incoming data if the incoming packet data fails to meet any of the conditions (step 182). Sink port 52 issues the rejection signal to the input port that placed the rejected packet data on data ring 60, 62, or 64. The input port stops receiving the packet and makes no more transfers of the packet's data to data ring 60, 62, or 64. When the rejected packet is targeted to multiple sink ports, the other sink ports will also stop receiving the packet data on ring 60, 62, or 64. The loss of data causes these ports to assert the TX_ER signal if packet transmission has already started.

If all the acceptance conditions are met, sink port 52 conditionally accepts the packet data. As part of initially accepting the data, ring interface 132 provides the data ring control signals to CAM 144. CAM 144 determines whether the data originates from a packet's first line (step 166). If the data is a first line, then CAM 144 allocates a new CAM entry for the packet (step 170). In one embodiment, each CAM entry includes an address tag and a pointer into FIFO 148. The address tag contains the Source Identifier for the packet from the data ring control signals. The pointer into FIFO 148 serves as an address in FIFO 148 for beginning to store the received data. The address for the pointer into FIFO 148 is determined at a later time.

Once a CAM location is allocated, FIFO request logic 146 determines whether FIFO 148 still has room for the newly accepted packet (step 172). As described above, FIFO request logic 146 transfers data from FIFOs 136, 138, and 140 to FIFO 148. When FIFO request logic 146 retrieves data for a new packet from FIFO 136, 138, or 140, request logic 146 makes this determination by comparing the bytes available in FIFO 148 to the Size field in the data packet header.

If FIFO 148 does not have sufficient space, then sink port 52 rejects the packet (step 182) and purges the packet's allocated entry in CAM 144. If FIFO 144 has sufficient space, FIFO request logic 146 allocates a block of memory in FIFO 148 for the packet (174). As part of the allocation, FIFO request logic 146 supplies CAM 144 with a FIFO pointer for the packet (step 174). Once a block of memory in FIFO 148 is allocated, request logic 146 stores the packet data in FIFO 148 (step 176). As part of storing the data in FIFO 148, FIFO request logic 146 provides CAM 144 with an updated FIFO pointer to the location in FIFO 148 for the next data received from this packet.

If the accepted packet data is not a packet's first line (step 166), then CAM 144 determines whether a FIFO pointer for the data's packet is maintained in CAM 144 (step 168). CAM 144 compares the Source Identifier provided by ring interface 132 against the address tags in CAM 144. If CAM 144 doesn't find a match, the accepted data is dropped and the process for that packet is done in sink port 52 (step 178).

If CAM 144 locates a matching source tag (step 168), then CAM 144 provides the corresponding pointer into FIFO 148 to FIFO request logic 146 when requested (step 180). FIFO request logic 146 requests the pointer after removing data from FIFO 136, 138, or 140. After obtaining the FIFO pointer, FIFO request logic 146 stores the data in FIFO 148 and provides CAM 144 with an updated FIFO pointer (step 176).

After performing a data store, FIFO request logic 146 determines whether the stored data is the last line of a packet (step 184). In one embodiment, FIFO request logic 146 receives the Last Line data ring control signal from ring interface 132 to make this determination. In an alternate embodiment, the control signals from data rings 60, 62, and 64 are carried through FIFOs 136, 138, and 140, along with their corresponding data. If the data is a packet's last line, then FIFO request logic 146 instructs CAM 144 to purge the entry for the packet (step 188). Otherwise, no further action is taken with respect to the stored data.

Output port 152 retrieves packet data from FIFO 148 and transmits packets onto communications link 66. FIFO request logic 146 provides output port 152 with a signal indicating whether FIFO 148 is empty. As long as FIFO 148 is not empty, output port 152 retrieves packet data from FIFO 148.

When multi-sink port 112 wishes to transfer a data packet to sink-port 52, multi-sink port 112 issues a request to sink port 52 on interface 114. FIFO request logic 146 receives the request and sink port 52 determines whether to accept the packet data. Sink port 52 accepts the data if sink port 52 is enabled and FIFO 148 in sink port 52 has capacity to handle the additional packet.

In one embodiment, sink port 52 performs the steps shown in FIG. 7 with the following exceptions and modifications. Sink port 52 does not determine whether multi-sink port 112 is sending a configuration packet—this is not necessary. FIFO request logic 146 determines whether to accept the packet from multi-sink port 112 (step 164), instead of ring interface 132 making this determination.

In response to a multi-sink request, the acceptance step (164) is modified. Acceptance is initially granted by FIFO request logic 146 asserting an acknowledgement signal on interface 114, if sink port 52 is enabled. If sink port 52 is not enabled, FIFO request logic 146 does not assert an acknowledgement. After sink port 52 issues an acknowledgement, multi-sink port 112 sends packet data to FIFO request logic 146. The remaining process steps described in FIG. 7 are performed for the data from multi-sink port 112. In one embodiment, if sink port 52 discovers that FIFO 148 has insufficient space (step 172, FIG. 7), sink port 52 withholds acknowledgement from multi-sink port 112—sink port 52 does not issue a rejection signal.

Sink port 52 regulates access to FIFO 148, so multi-sink port 112 and data rings 60, 62, and 64 have access for write operations and output port 152 has access for read operations. In one embodiment, sink port 52 allocates access to FIFO 148 within every 8 accesses to FIFO 148. Within every 8 accesses to FIFO 148, sink port 52 allocates 6 access for writing FIFO 148 with packet data not originating from multi-sink port 112. Sink port 52 allocates 1 access for writing packet data originating from multi-sink port 112. Sink port 52 reserves 1 cycle for output port 152 to read data from FIFO 148. In one such embodiment, sink port 52 only allows concurrent reception of 6 packets from rings 60, 62, arid 64 and 1 packet from multi-sink port interface 114.

G. Multi-Sink Port

Figure 8:
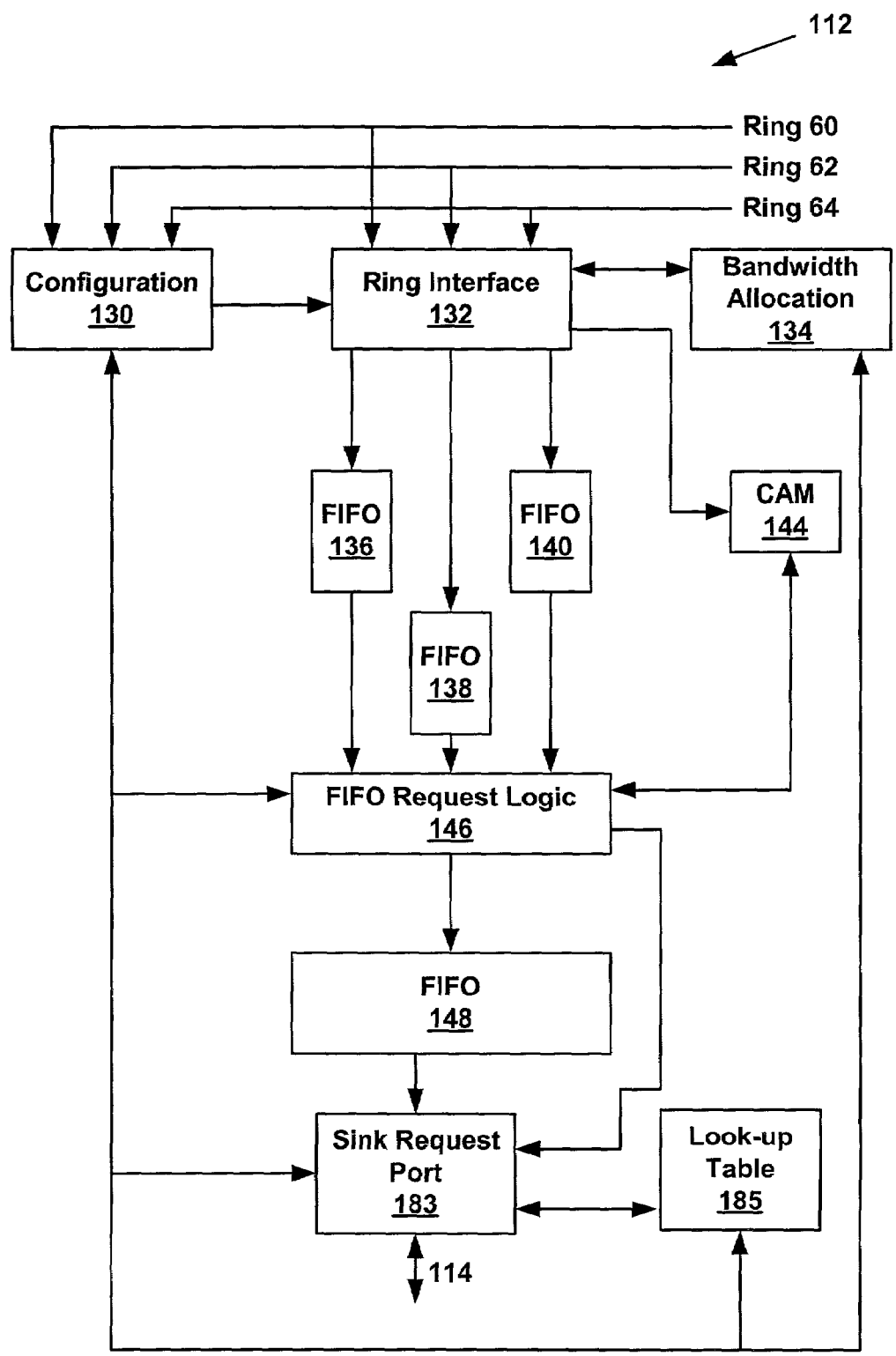
FIG. 8 shows a block diagram for the multi-sink port depicted in FIG. 4.

FIG. 8 depicts a design for multi-sink port 112 in one embodiment of the present invention. Multi-sink port 112 is very similar to the sink port 52 architecture and operation shown in FIGS. 6 and 7. The elements in FIG. 8 with the same reference numbers as elements in FIG. 6 operate the same, with the following exception. Ring interface 132 does not accept configuration packets targeting ports other than multi-sink port 112.

In multi-sink port 112, sink request port 183 and lookup table 185 replace output port 152 from sink port 52. Lookup table 185 contains the contents of the Multicast Registers described above with reference to the configuration registers for multi-sink port 112 (Table II)—configuration block 130 passes Multicast Register information to look-up table 185 and maintains the other configuration registers for multi-sink port 112. Sink request port 183 is coupled to FIFO 148 to retrieve packet data and FIFO request logic 146 to receive a signal indicating whether FIFO 148 is empty. Sink request port 183 retrieves data from FIFO 148 when FIFO 148 is not empty. Sink request port 183 forwards the retrieved packet data to sink ports targeted to receive the packet data. Sink request port 183 is coupled to lookup table 185 to identify the sink ports targeted by the packet.

Sink request port 183 supplies packet data on sink port interface 114. Sink port interface 114 includes 2 separate buses. One bus carries packet data to sink ports that first respond to a data transfer request from multi-sink port 112. The other bus provides the same packet data to sink ports that accept the request from multi-sink port 112 at a later time. In one embodiment, each bus in interface 114 includes an 8 byte wide data path and the control signals identified above for data rings 60, 62, and 64. In order to establish communication with the sink ports, interface 114 also includes request and acknowledgement signals.

Figure 9:
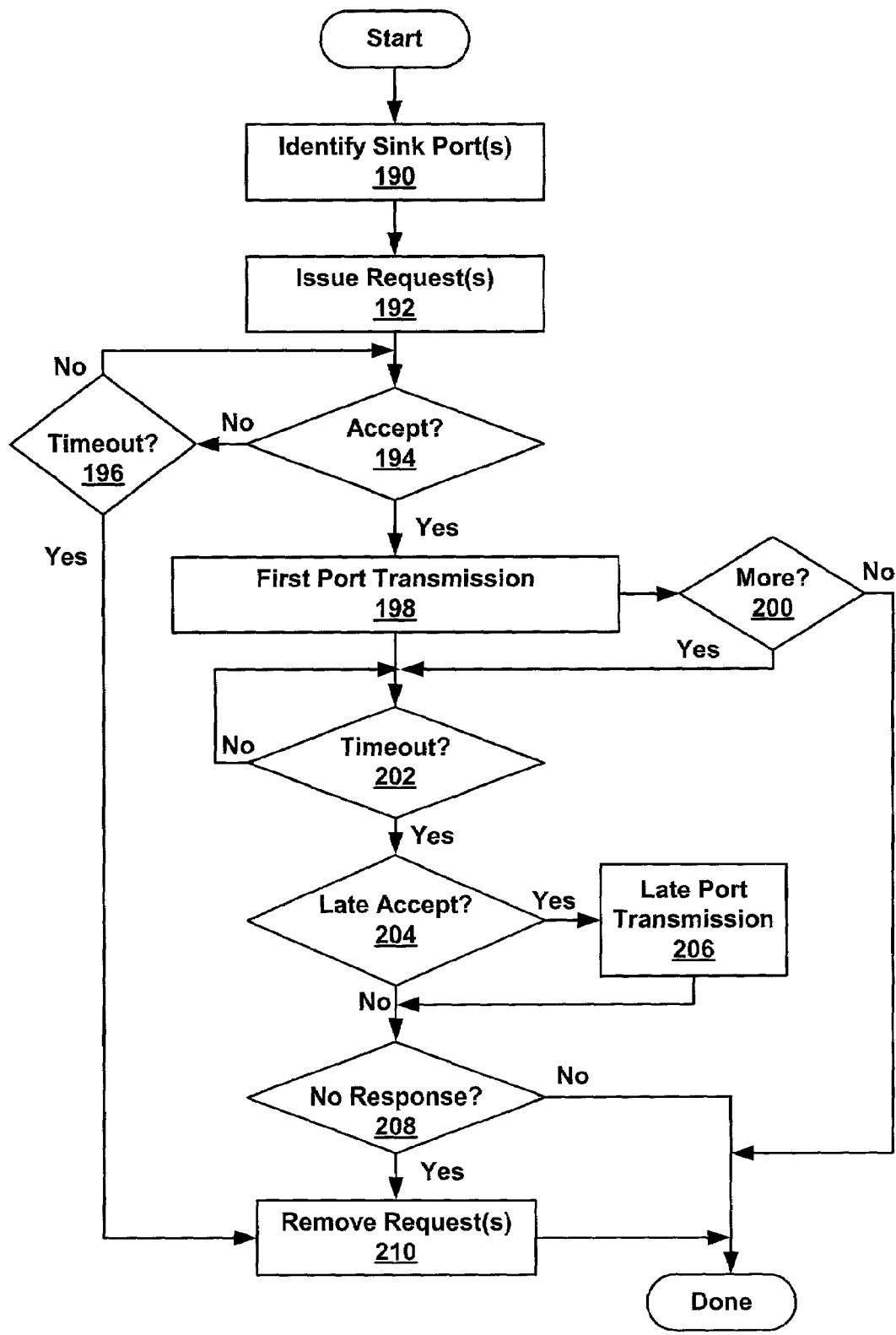
FIG. 9 shows a process employed by the multi-sink port depicted in FIG. 8 for transferring packet data to sink ports.

FIG. 9 illustrates a series of steps performed by sink request port 183 to transfer packets to sink ports in one embodiment of the present invention. Prior to the process shown in FIG. 9, multi-sink port 112 stores data into FIFO 148 in port 112 by employing the process described above with reference to FIG. 7. Sink request port 183 retrieves a data packet from FIFO 148 and determines the targeted sink ports for the packet (step 190). Sink request port 183 provides the packet's Destination Address to lookup table 185. Lookup table 185 employs a portion of the Destination Address to identify the targeted sink ports. In one embodiment, lookup table 183 employs the 6 least significant bits of the Destination Address to select a Multicast Register, which identifies the sink ports corresponding to the Destination Address.

Sink request port 183 asserts a request to the targeted sink ports on interface 114 (step 192). Sink request port 183 then waits for a sink port acknowledgement (step 194). Sink request port 183 only allows the request to remain outstanding for a predetermined period of time. In one embodiment, a user configures this time period to either 1,500 or 9,000 cycles of the internal clock for cross-bar switch 110. While the request is pending without acknowledgement, sink request port 183 monitors the elapsed request time to determine whether the predetermined time period has elapsed (step 196). As long as the time period has not elapsed, sink request port 183 continues to await an acknowledgement (step 194). If the predetermined period of time elapses, sink request port 183 removes the requests and the multi-sink data packet is not forwarded (step 210).

After an acknowledgement is received (step 194), sink request port 183 transmits packet data to the accepting sink ports on the first bus in interface 114, along with the specified control signals (step 198). After initiating the packet data transmission, sink request port 183 determines whether more sink port requests are outstanding (step 200). If sink request port 183 detects that all requested sink targets have provided an acknowledgement (step 200), then the multi-sink data transmission process is over If sink request port 183 determines that not all requested sink ports have provided an acknowledgement (step 200), port 183 waits for the predetermined time period to elapse (202). After the time period elapses, sink request port 180 determines whether any additional sink ports have acknowledged the request (step 204). For each sink port issuing a late acknowledgement, sink request port transmits packet data to the port over the second bus in interface 114, along with data ring control signals (step 206).

If there are no late acceptances, sink request port 183 determines whether any ports failed to respond to the pending request (step 208). Sink request port 183 makes this same determination after initiating packet data transmission to the late accepting sink ports. For each sink port not acknowledging the request, sink request port 183 removes the request (step 210). If there are no sink ports failing to acknowledge the request, then the multi-sink port's requested data transfer is complete.

Multi-sink port 112 repeats the above-described process for all data stored in FIFO 148.

H. Bandwidth Allocation

Bandwidth allocation circuit 134 (FIG. 6) monitors traffic flowing through sink port 52 and manages the bandwidth allocated to different data packet priority levels. In multi-sink port 112, bandwidth allocation circuit 134 (FIG. 8) performs the same function. The operation of bandwidth allocation circuit 134 is described below with reference to sink port 52. The same operation applies to sink ports 54, 55, 56, 57, and 58, as well as multi-sink port 112.

Data packets arrive at cross-bar switch 10 with a Priority Level field in their headers (See Table III). Bandwidth allocation circuit 134 instructs ring interface circuit 132 to reject packets with priority levels receiving more bandwidth than allotted. Ring interface 132 employs these instructions to reject new incoming packets during the acceptance step (step 164) described above with reference to FIG. 7. In one embodiment, bandwidth allocation circuit 134 doesn't call for the rejection of any priority levels until the number of bytes in FIFO 148 exceeds a predetermined threshold and multiple priority levels appear at ring interface 132.

Figure 10:
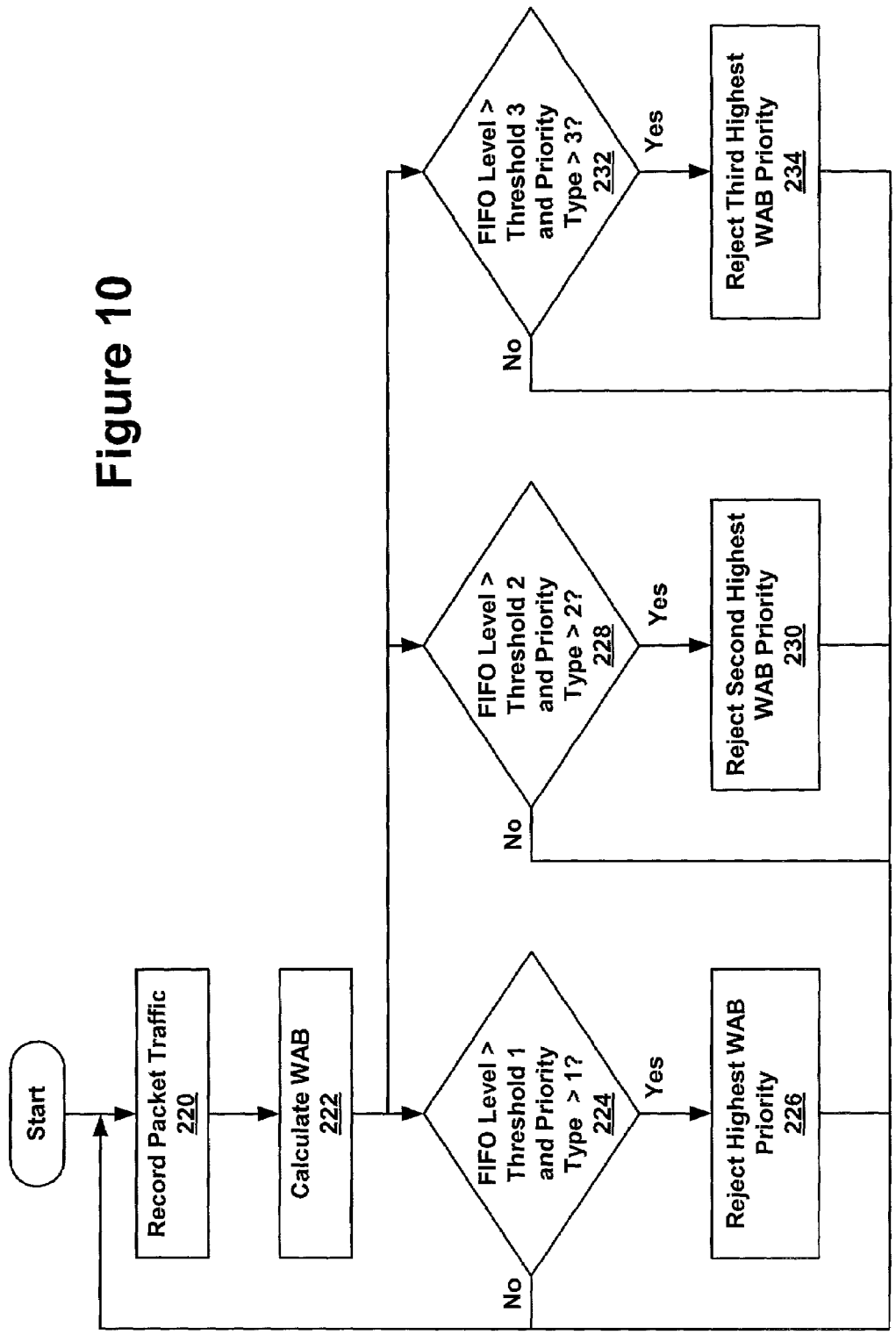
FIG. 10 illustrates a bandwidth allocation process employed by a cross-bar switch in accordance with the present invention.

FIG. 10 illustrates a series of steps performed by bandwidth allocation circuit 134 in sink port 52 and multi-sink port 112 in one embodiment of the present invention. In configuring the sink port or multi-sink port for bandwidth allocation, a user configures the port to have three threshold values for FIFO 148 (See Tables I and II—FIFO Thresholds field). A user provides these threshold values in a write command configuration packet for entry into the port's configuration registers.

As packets pass through ring interface 132, bandwidth allocation circuit 134 records the amount of packet traffic for each priority level for a fixed time window (step 220). Bandwidth allocation circuit 134 also maintains historic traffic counts for each priority level. In one embodiment, the time window is approximately half the size of FIFO 148 (approximately 16 K bytes in one embodiment), and four historical time window periods are maintained. In alternate embodiments, the time window period and the number of historical time window periods are modified. A greater number of historical time periods decreases the significance of the traffic in the current time period in allocating bandwidth. In one embodiment, there are 4 possible priority levels, and the priority level for a packet appears in the packet's header (See Table III). In one such embodiment, bandwidth allocation circuit 134 records packet traffic for each priority level using the Size field in packet headers.

Bandwidth allocation circuit 134 calculates a weighted average bandwidth ("WAB") for each priority level (step 222). Sink port 52 and multi-sink port 112 are configured to have a Priority Weighting Value ("PWV") for each priority level (See Tables I and II). Bandwidth allocation circuit 134 calculates the WAB for each priority by dividing the sum of the priority's recorded traffic for the current and historical time window periods by the priority's PWV.

After performing WAB calculations (step 222), bandwidth allocation circuit 134 makes a series of determinations. Bandwidth allocation circuit 134 determines whether the lowest FIFO threshold value (Threshold 1) has been surpassed and more than 1 WAB value is greater than 0—indicating that more than 1 priority level appears in the received data packets (step 224). If these conditions are both true, bandwidth allocation circuit 134 instructs ring interface 132 to reject new incoming packets with a priority level matching the priority level with the highest WAB value (step 226). If either the FIFO threshold or WAB condition isn't met, bandwidth allocation circuit 134 does not issue the rejection instruction.

Bandwidth allocation circuit 134 also determines whether the second highest FIFO threshold value (Threshold 2) has been surpassed and more than 2 WAB values are greater than 0—indicating that more than 2 priority levels appear in the received data packets (step 228). If these conditions are both true, bandwidth allocation circuit 134 instructs ring interface 132 to reject new incoming packets with a priority level matching the priority level with the second highest WAB value (step 230). If either condition is not met, bandwidth allocation circuit 134 does not issue the rejection instruction.

Bandwidth allocation circuit 134 also determines whether the highest FIFO threshold value (Threshold 3) has been surpassed and more than 3 WAB values are greater than 0—indicating that more than 3 priority levels appear in the received data packets (step 232). If these conditions are both true, bandwidth allocation circuit 134 instructs ring interface 132 to reject new incoming packets with a priority level matching the priority level with the third highest WAB value (step 234). If either condition fails, bandwidth allocation circuit 134 does not issue the rejection instruction. In one embodiment, bandwidth allocation circuit 134 performs the above-described tests and issues rejection instructions on a free running basis.

Ring interface 132 responds to a rejection instruction from bandwidth allocation circuit 134 by refusing to accept packets with identified priority levels. Ring interface 132 continues rejecting the packets for a predetermined period of time. In one embodiment, the predetermined time period is 6000 cycles of the port's clock.

The following provides an example of bandwidth allocation circuit 134 in operation. FIFO 148 has 32,000 bytes, and the FIFO thresholds are as follows: 1) Threshold 1 is 18,000 bytes; 2) Threshold 2 is 20,000 bytes; and 3) Threshold 3 is 28,000 bytes. The priority weighting values are as follows: 1) PWV for Priority 1 is 16; 2) PWV for Priority 2 is 8; 3) PWV for Priority 3 is 4; and 4) PWV for Priority 4 is 128.

The sum of the recorded traffic in the current time window and four historical time windows for each priority is 128 bytes, and FIFO 148 contains 19,000 bytes. The WAB values are as follows: 1) WAB for Priority 1 is 8; 2) WAB for Priority 2 is 16; 3) WAB for Priority 3 is 32; and 4) WAB for Priority 4 is 1. This results in bandwidth allocation circuit 134 instructing ring interface 132 to reject packets with priority level 3—the priority level with the highest WAB value.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A cross-bar switch comprising:
a set of input ports to receive data packets;
a set of sink ports in communication with said set of input ports to receive and forward said data packets;
a first port address table adapted to identify a plurality of destinations supported by a first sink port in said set of sink ports; and
a set of data rings internal to the crossbar switch that couples the input ports to the sink ports to communicate the data packets from the input ports of the crossbar switch to the sink ports,
wherein at least one sink port in said set of sink ports snoops said internal set of data rings and accepts those data packets directed to the destinations identified by the first port address table, and
wherein said first sink port includes a configuration block adapted to receive configuration packets.

2. The cross-bar switch of claim 1, further including:
a set of port address tables, wherein each port address table in said set of port address tables is adapted to identify a plurality of destinations supported by a sink port in said set of sink ports.

3. The cross-bar switch of claim 1, wherein said first port address table is adapted to store data identifying a plurality of destinations supported by said first sink port.

4. The cross-bar switch of claim 1, wherein each sink port in said set of sink ports is adapted to concurrently receive a plurality of data packets having different destination addresses.

5. The cross-bar switch of claim 1, wherein said set of data rings includes a plurality of data rings.

6. The cross-bar switch of claim 1, wherein said first sink port snoops data packets received by said set of input ports and determines whether to accept a first data packet based on a set of criteria, wherein said set of criteria includes said first data packet being targeted to a destination identified in said first port address table.

7. The cross-bar switch of claim 6, wherein said set of criteria further includes:
said first sink port having sufficient storage space for storing first data packet, and
a total number of packets being received by said first sink port not exceeding a predetermined number of packets.

8. The cross-bar switch of claim 1, wherein said first sink port includes:
an interface in communication with said set of input ports to receive data from data packets:
a storage buffer coupled to said interface to receive and store said data; and
an output port coupled to said storage buffer to receive said data from said storage buffer and transmit said data on a communications link.

9. The cross-bar switch of claim 8, wherein said storage buffer is adapted to concurrently receive a plurality of data packets.

10. The cross-bar switch of claim 8, wherein said interface is adapted to access said first port address table to determine whether a data packet has a destination address corresponding to a destination identified in said first port address table.

11. The cross-bar switch of claim 1, wherein said configuration block is adapted to store destination identifiers from said configuration packets in said first port address table.

12. A cross-bar switch comprising:
a set of input ports to receive data packets;
a set of sink ports in communication with said set of input ports to receive and forward said data packets;
a first port address table adapted to identify a plurality of destinations supported by a first sink port in said set of sink ports;
a second port address table adapted to identify a second plurality of destinations as being supported by a second sink port in said set of sink ports, wherein said first port address table identifies said at least one of said second plurality of destinations as being supported by said first sink port, and
a set of data rings internal to the crossbar switch that couples the input ports to the sink ports to communicate the data packets from the input ports of the crossbar switch to the sink ports,
wherein at least one sink port in said set of sink ports snoops said internal set of data rings and accepts those data packets directed to the destinations identified by the first port address table.

13. A cross-bar switch comprising:
a set of input ports to receive data packets;
a set of sink ports in communication with said set of input ports to receive and forward said data packets;
a set of data rings internal to the cross-bar switch to communicate the data packets from said set of input ports to said set of sink ports; and
a set of port address tables in communication with said set of sink ports, wherein each port address table in said set of port address tables is adapted to identify a plurality of destinations supported by a sink port in said set of sink ports,
wherein said set of port address tables includes a first port address table adapted to store data identifying a plurality of destinations supported by a first sink port in said set of sink ports, and
wherein said first sink port snoops data packets on each data ring in said set of data rings and determines whether to accept a first data packet based on a set of criteria, wherein said set of criteria includes said first data packet being targeted to a destination identified in said first port address table.

14. The cross-bar switch of claim 13, wherein said set of criteria further includes:
said first sink port having sufficient storage space for storing said first data packet, and
a total number of packets being received by said first sink port not exceeding a predetermined number of packets.

15. The cross-bar switch of claim 13, wherein said first sink port includes:
a ring interface coupled to said set of data rings to receive data from data packets;
a storage buffer coupled to said ring interface to receive and store said data; and
an output port coupled to said storage buffer to receive said data from said storage buffer and transmit said data on a communications link.

16. The cross-bar switch of claim 15, wherein said storage buffer is adapted to concurrently receive a plurality of data packets.

17. The cross-bar switch of claim 13, wherein said first sink port includes a configuration block adapted to receive configuration packets.

18. A cross-bar switch comprising:
a set of input ports to receive data packets;
a set of sink ports in communication with said set of input ports to receive and forward said data packets;
a set of data rings internal to the cross-bar switch to communicate the data packets from said set of input ports to said set of sink ports; and
a set of port address tables in communication with said set of sink ports, wherein each port address table in said set of port address tables is adapted to identify a plurality of destinations supported by a sink port in said set of sink ports,
wherein said set of port address tables includes a first port address table adapted to store data identifying a plurality of destinations supported by a first sink port in said set of sink ports, and
a second port address table in communication with a second sink port in said set of sink ports and adapted to store data identifying a second destination as being supported by the second sink port in said set of sink ports,
wherein said first port address table identifies said second destination as being supported by said first sink port.

19. A cross-bar switch comprising:
a set of input ports to receive data packets;
a set of sink ports in communication with said set of input ports to receive and forward said data packets;
a set of data rings internal to the cross-bar switch to communicate the data packets from said set of input ports to said set of sink ports;
a set of port address tables in communication with said set of sink ports, wherein each port address table in said set of port address tables is adapted to identify a plurality of destinations supported by a sink port in said set of sink ports,
a ring interface coupled to said set of data rings to receive data from data packets;
a storage buffer coupled to said ring interface to receive and store said data; and
an output port coupled to said storage buffer to receive said data from said storage buffer and transmit said data on a communications link,
wherein said set of port address tables includes a first port address table adapted to store data identifying a plurality of destinations supported by a first sink port in said set of sink ports, and
wherein said ring interface is adapted to access said first port address table to determine whether a packet on said set of data rings has a destination address corresponding to a destination identified in said first port address table.

20. A cross-bar switch comprising:
a set of input ports to receive data packets;
a set of sink ports in communication with said set of input ports to receive and forward said data packets;
a set of data rings internal to the cross-bar switch to communicate the data packets from said set of input ports to said set of sink ports; and
a set of port address tables in communication with said set of sink ports, wherein each port address table in said set of port address tables is adapted to identify a plurality of destinations supported by a sink port in said set of sink ports, wherein said first sink port includes a configuration block adapted to receive configuration packets, and
wherein said configuration block is adapted to store destination identifiers from said configuration packets in said first port address table.

21. A method comprising the steps of:
(a) a set of input ports receiving a set of data packets;
(b) a sink port in a set of sink ports, accepting data packets in said set of data packets, wherein said step (b) includes the step of:
(1) said sink port determining that a first data packet has a first destination supported by said sink port,
(2) said sink port accepting said first data packet,
(3) said sink port determining that a second data packet has a second destination supported by said sink port, wherein said first destination is different than said second destination, and
(4) said sink port accepting said second data packet; and
(c) said sink port, concurrently collecting data for data packets accepted by said sink port, wherein said step (c) includes the steps of:
(1) said sink port collecting data for said first data packet; and
(2) said sink port collecting data for said second data packet concurrently with collecting data for said first data packet;
(d) an input port in said set of input ports receiving a configuration packet containing data identifying destinations supported by said sink port; and
(e) said sink port collecting data from said configuration packet, wherein said data collected in said step (e) identifies destinations supported by said sink port.

22. The method of claim 21, further including the step of:
(f) transferring said set of data packets from said set of input ports to a set of data rings internal to a switch and in communication with said set of sink ports.

23. The method of claim 21, wherein said data collected in said step (f) identifies said first destination and said second destination.

24. The apparatus of claim 21, wherein said step (b)(1) includes the step of:
(i) said sink port identifying data in a port address table indicating that said sink port supports said first destination, and
wherein said step (b)(3) includes the step of:
(ii) said sink port identifying data in said port address table indicating that said sink port supports said second destination.

25. The method of claim 21, wherein said step (b) includes the step of:
(5) said sink port determining whether a set of criteria is met, wherein said step (b)(5) includes the steps of:
(i) determining whether said sink port is enabled to receive data packets;
(ii) determining whether said sink port has sufficient resources to store said first data packet and said second data packet;
(iii) determining whether said sink port is currently receiving a maximum allowable number of packets;
(iv) determining whether said first data packet has a number of bytes within a predetermined range; and
(v) determining whether said second data packet has a number of bytes within a predetermined range.

26. The method of claim 21, further including the step of:
(g) said sink port issuing a rejection signal if said sink port determines not to accept said data packet in said step (b), wherein said rejection signal terminates further reception of said data packet by said sink port.

27. The method of claim 21, further including the step of:
(h) said sink port transmitting said data packets collected in said step (c).

28. The method of claim 21, further including the steps of:
(j) a second sink port in said set of sink ports, accepting data packets in said set of data packets, wherein said step (j) includes the step of:
  (1) said second sink port determining that said first data packet is targeted for said first destination, and
  (2) said second sink port accepting said first data packet; and
(k) said second sink port collecting data for data packets accepted by said second sink port, wherein said step (k) includes the step of:
  (1) said second sink port collecting data for said first data packet.

29. A method of transferring data within a switch comprising the steps of:
(a) a set of input ports receiving a set of data packets;
(b) transferring said set of data packets from said set of input ports to a set of data rings internal to the switch and in communication with a set of sink ports of the switch;
(c) a sink port in said set of sink ports, accepting data packets in said set of data packets from said set of data rings, wherein said step (c) includes the steps of:
  (1) said sink port determining that a first data packet has a first destination supported by said sink port, wherein said step (c)(1) includes the step of: said sink port identifying data in a port address table indicating that said sink port supports said first destination,
  (2) said sink port accepting said first data packet,
  (3) said sink port determining that a second data packet has a second destination supported by said sink port, wherein said first destination is different than said second destination, wherein said step (c)(3) includes the step of said sink port identifying data in said port address table indicating that said sink port supports said second destination, and
  (4) said sink port accepting said second data packet; and
(d) said sink port collecting data for data packets accepted by said sink port, wherein said step (d) includes the steps of:
  (1) said sink port collecting data for said first data packet, and
  (2) said sink port collecting data for said second data packet.

30. The method of claim 29, further including the steps of:
(e) an input port in said set of input ports receiving a configuration packet containing data identifying destinations supported by said sink port; and
(f) said sink port collecting data from said configuration packet in said set of configuration packets, wherein said data collected in said step (f) identifies destinations supported by said sink port.

31. The method of claim 29, wherein said step (c) includes the step of:
(5) said sink port, determining whether a set of criteria is met, wherein said step (c)(5) includes the steps of:
  (i) determining whether said sink port is enabled to receive data packets;
  (ii) determining whether said sink port has sufficient resources to store said first data packet and said second data packet;
  (iii) determining whether said sink port is currently receiving a maximum allowable number of packets;
  (iv) determining whether said first data packet has a number of bytes within a predetermined range; and
  (v) determining whether said second data packet has a number of bytes within a predetermined range.

32. The method of claim 29, further including the steps of:
(g) a second sink port in said set of sink ports accepting data packets in said set of data packets, wherein said step (g) includes the step of:
  (1) said second sink port determining that said first data packet is targeted for said first destination, and
  (2) said second sink port accepting said first data packet; and
(h) said second sink port collecting data for data packets accepted by said second sink port, wherein said step (h) includes the step of:
(1) said second sink port collecting data for said first data packet.

33. A switch comprising:
a set of input ports to receive data packets; and
a set of sink ports in communication with said set of input ports to receive and forward said data packets; and
a set of port address tables in communication with said set of sink ports, wherein each port address table in said set of port address tables is adapted to identify a plurality of destinations supported by a sink port in said set of sink ports,
wherein at least one of the sink ports in said set of sink ports is adapted to concurrently receive from the input ports a plurality of data packets having different destination addresses,
wherein at least one of the sink ports includes a configuration block adapted to receive configuration packets, and
wherein said configuration block is adapted to store destination identifiers from said configuration packets in one of said port address tables.

34. The switch of claim 33, further comprising a set of data rings internal to the crossbar switch to communicate the data packets from said set of input ports and said set of sink ports.

* * * * *

UNITED STATES PATENT AND TRADEMARK OFFICE
CERTIFICATE OF CORRECTION

| | |
|---|---|
| PATENT NO. | : 7,065,090 B2 |
| APPLICATION NO. | : 10/036603 |
| DATED | : June 20, 2006 |
| INVENTOR(S) | : Nazar Zaidi, Abbas Rashid and Mark Bryers |

Page 1 of 1

It is certified that error appears in the above-identified patent and that said Letters Patent is hereby corrected as shown below:

Column 7, Line 65, "Resister's" should be --Register's--

Column 9, Line 48, after "into" delete "to"

Signed and Sealed this

Twentieth Day of October, 2009

David J. Kappos
*Director of the United States Patent and Trademark Office*